(12) United States Patent
Fang et al.

(10) Patent No.: US 11,024,294 B2
(45) Date of Patent: *Jun. 1, 2021

(54) SYSTEM AND METHOD FOR DIALOGUE MANAGEMENT

(71) Applicant: DMAI, Inc., Los Angeles, CA (US)

(72) Inventors: Rui Fang, Los Angeles, CA (US); Changsong Liu, Los Angeles, CA (US)

(73) Assignee: DMAI, INC., Los Angeles, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/233,829

(22) Filed: Dec. 27, 2018

(65) Prior Publication Data

US 2019/0206393 A1 Jul. 4, 2019

Related U.S. Application Data

(60) Provisional application No. 62/612,108, filed on Dec. 29, 2017.

(51) Int. Cl.
*G10L 15/18* (2013.01)
*G06N 20/00* (2019.01)
(Continued)

(52) U.S. Cl.
CPC .......... *G10L 15/1815* (2013.01); *G06N 20/00* (2019.01); *G10L 15/1822* (2013.01);
(Continued)

(58) Field of Classification Search
CPC ... G10L 15/22; G10L 15/265; G10L 15/1815; G10L 15/1822; G10L 25/63; G06F 40/20;
(Continued)

(56) References Cited

U.S. PATENT DOCUMENTS

D47,788 S 9/1915 Gruelle
D67,417 S 5/1925 Scott, Jr.
(Continued)

FOREIGN PATENT DOCUMENTS

CN 104350541 A 2/2015
KR 10-1336641 B1 12/2013
(Continued)

OTHER PUBLICATIONS

International Search Report and Written Opinion dated Mar. 22, 2019 in International Application PCT/US2018/067672.
(Continued)

*Primary Examiner* — Paras D Shah
(74) *Attorney, Agent, or Firm* — Pillsbury Winthrop Shaw Pittman LLP

(57) ABSTRACT

The present teaching relates to method, system, medium, and implementations for user machine dialogue. An instruction is received by an agent device for rendering a communication directed to a user involved in a dialogue in a dialogue scene and is used to render the communication. A first representation of a mindset of the agent is updated accordingly after the rendering. Input data are received in one or more media types capturing a response from the user and information surrounding the dialogue scene and a second representation of a mindset of the user is updated based on the response from the user and the information surrounding of the dialogue scene. A next communication to the user is then determined based on the first representation of the mindset of the agent and the second representation of the mindset of the user.

21 Claims, 23 Drawing Sheets

(51) Int. Cl.
*G10L 15/22* (2006.01)
*G06K 9/00* (2006.01)
*G10L 25/63* (2013.01)

(52) U.S. Cl.
CPC .......... *G10L 15/22* (2013.01); *G06K 9/00302* (2013.01); *G10L 25/63* (2013.01)

(58) Field of Classification Search
CPC ...... G06F 40/2085; G06F 40/30; G06F 40/35; G06F 40/40
See application file for complete search history.

(56) References Cited

U.S. PATENT DOCUMENTS

| | | |
|---|---|---|
| D176,475 S | 12/1955 | Norrick |
| D189,043 S | 10/1960 | Allen |
| D217,266 S | 4/1970 | Greene |
| D248,112 S | 6/1978 | Seggerman |
| D459,768 S | 7/2002 | McDermott |
| 6,570,555 B1 | 5/2003 | Prevost |
| 6,728,679 B1 | 4/2004 | Strubbe |
| D502,426 S | 3/2005 | Weiser |
| D549,756 S | 8/2007 | Park |
| D675,656 S | 2/2013 | Sutherland |
| 8,473,449 B2 | 6/2013 | Visel |
| D700,522 S | 3/2014 | Toro |
| 8,719,217 B1 | 5/2014 | Vivalda et al. |
| 8,942,849 B2 | 1/2015 | Bruno et al. |
| 9,183,560 B2 | 11/2015 | Abelow |
| 9,381,426 B1 | 7/2016 | Hughes |
| D802,040 S | 11/2017 | Canoso |
| D810,167 S | 2/2018 | Yang |
| D810,800 S | 2/2018 | Wang |
| D811,458 S | 2/2018 | Wang |
| D817,375 S | 5/2018 | Deyle |
| 10,044,862 B1 | 8/2018 | Cai |
| D840,451 S | 2/2019 | Yoo |
| D840,452 S | 2/2019 | Yoo |
| D840,453 S | 2/2019 | Yoo |
| 10,242,666 B2 | 3/2019 | Monceaux |
| D855,673 S | 8/2019 | Sutherland |
| 10,391,636 B2 | 8/2019 | Breazeal |
| 10,417,567 B1 | 9/2019 | Miller |
| D870,787 S | 12/2019 | Kim |
| D870,788 S | 12/2019 | Kim |
| D881,249 S | 4/2020 | Kim |
| D888,121 S | 6/2020 | Kim |
| D888,165 S | 6/2020 | Michaelian |
| D893,572 S | 8/2020 | Kim |
| D894,248 S | 8/2020 | Kim |
| 2001/0020255 A1 | 9/2001 | Hofmann |
| 2003/0084056 A1 | 5/2003 | DeAnna |
| 2004/0148375 A1 | 7/2004 | Levett |
| 2006/0206337 A1 | 9/2006 | Paek |
| 2007/0015121 A1 | 1/2007 | Johnson |
| 2008/0015058 A1 | 1/2008 | Noble |
| 2008/0091406 A1 | 4/2008 | Baldwin |
| 2008/0172173 A1 | 7/2008 | Chang et al. |
| 2008/0235258 A1 | 9/2008 | Chung |
| 2008/0306808 A1 | 12/2008 | Adjali |
| 2008/0313116 A1 | 12/2008 | Groble |
| 2009/0055019 A1 | 2/2009 | Stiehl et al. |
| 2009/0186693 A1 | 7/2009 | Panoff |
| 2011/0077085 A1 | 3/2011 | Finn |
| 2011/0093158 A1 | 4/2011 | Theisen |
| 2011/0119716 A1 | 5/2011 | Coleman |
| 2012/0086630 A1 | 4/2012 | Zhu |
| 2012/0212499 A1 | 8/2012 | Haddick |
| 2013/0278631 A1 | 10/2013 | Border |
| 2014/0108019 A1 | 4/2014 | Ehsani |
| 2014/0142757 A1 | 5/2014 | Ziegler et al. |
| 2014/0164509 A1 | 6/2014 | Lynch |
| 2014/0297516 A1 | 10/2014 | Brown |
| 2014/0337010 A1 | 11/2014 | Akolkar |
| 2015/0012463 A1* | 1/2015 | Rosenthal ............... G10L 25/63 706/11 |
| 2015/0100157 A1 | 4/2015 | Houssin et al. |
| 2015/0190927 A1 | 7/2015 | Sutherland |
| 2015/0254675 A1 | 9/2015 | Kannan |
| 2015/0356451 A1 | 12/2015 | Gupta |
| 2015/0363244 A1 | 12/2015 | Bott |
| 2016/0029426 A1 | 1/2016 | Bangolae |
| 2016/0055236 A1 | 2/2016 | Frank |
| 2016/0104486 A1 | 4/2016 | Penilla |
| 2016/0193732 A1 | 7/2016 | Breazeal et al. |
| 2016/0236690 A1 | 8/2016 | Juneja |
| 2016/0300252 A1 | 10/2016 | Frank |
| 2016/0343160 A1 | 11/2016 | Blattner |
| 2016/0379643 A1 | 12/2016 | Ito |
| 2017/0091661 A1 | 3/2017 | Sanchez |
| 2017/0116173 A1* | 4/2017 | Lev-Tov ............... H04M 3/493 |
| 2017/0116982 A1 | 4/2017 | Gelfenbyn et al. |
| 2017/0139879 A1 | 5/2017 | Sharifi |
| 2017/0148434 A1 | 5/2017 | Monceaux |
| 2017/0160813 A1 | 6/2017 | Divakaran |
| 2017/0162197 A1 | 6/2017 | Cohen |
| 2017/0206064 A1 | 7/2017 | Breazeal et al. |
| 2017/0213307 A1 | 7/2017 | Moturu |
| 2017/0228520 A1 | 8/2017 | Kidd |
| 2017/0345105 A1 | 11/2017 | Isaacson |
| 2017/0352351 A1 | 12/2017 | Kimura |
| 2017/0358296 A1 | 12/2017 | Segalis |
| 2018/0018373 A1 | 1/2018 | Yazdian |
| 2018/0032884 A1 | 2/2018 | Murugeshan |
| 2018/0068012 A1* | 3/2018 | O'Connor ......... G06F 16/90332 |
| 2018/0075847 A1* | 3/2018 | Lee ..................... G06F 16/3329 |
| 2018/0101776 A1* | 4/2018 | Osotio ................. G06N 20/00 |
| 2018/0124242 A1* | 5/2018 | Zimmerman ....... G10L 15/1815 |
| 2018/0165582 A1* | 6/2018 | Cha ....................... G06N 20/00 |
| 2018/0178375 A1 | 6/2018 | Yang |
| 2018/0204572 A1 | 7/2018 | Manabe |
| 2018/0204573 A1 | 7/2018 | Iwasa |
| 2018/0218080 A1* | 8/2018 | Krishnamurthy ...... G06N 3/006 |
| 2018/0233128 A1 | 8/2018 | Chen |
| 2018/0307674 A1* | 10/2018 | Akkiraju ................. G06F 40/35 |
| 2018/0314689 A1 | 11/2018 | Wang |
| 2018/0314980 A1 | 11/2018 | Osotio |
| 2018/0316631 A1* | 11/2018 | Koukoumidis ........ G06N 3/006 |
| 2018/0367484 A1 | 12/2018 | Rodriguez |
| 2019/0033957 A1 | 1/2019 | Shionozaki |
| 2019/0049942 A1 | 2/2019 | Dusane |
| 2019/0050494 A1 | 2/2019 | Rao |
| 2019/0130904 A1* | 5/2019 | Homma .................. G10L 15/26 |
| 2019/0146647 A1 | 5/2019 | Ramchandran |
| 2019/0182832 A1* | 6/2019 | Oizumi .................. H04W 72/02 |
| 2019/0188261 A1* | 6/2019 | Herzig ................... G10L 25/63 |
| 2019/0189259 A1 | 6/2019 | Clark |
| 2019/0202061 A1 | 7/2019 | Shukla |
| 2019/0202063 A1 | 7/2019 | Shukla |
| 2019/0205390 A1 | 7/2019 | Fang |
| 2019/0206393 A1 | 7/2019 | Fang |
| 2019/0206401 A1 | 7/2019 | Liu |
| 2019/0206402 A1 | 7/2019 | Shukla |
| 2019/0206407 A1 | 7/2019 | Shukla |
| 2019/0255995 A1 | 8/2019 | Friedman |
| 2020/0152193 A1 | 5/2020 | Onaka |

FOREIGN PATENT DOCUMENTS

WO 2012010451 A1 1/2012
WO 2017173141 A1 10/2017

OTHER PUBLICATIONS

International Search Report and Written Opinion dated Mar. 22, 2019 in International Application PCT/US2018/067634.
International Preliminary Report on Patentability dated Aug. 27, 2020 in International Application PCT/US2018/067695.
International Search Report and Written Opinion dated Mar. 28, 2019 in International Application PCT/US2018/067695.
International Preliminary Report on Patentability dated Aug. 27, 2020 in International Application PCT/US2018/067690.

(56) References Cited

OTHER PUBLICATIONS

International Search Report and Written Opinion dated Mar. 28, 2019 in International Application PCT/US2018/067690.
International Preliminary Report on Patentability dated Aug. 27, 2020 in International Application PCT/US2018/067684.
International Search Report and Written Opinion dated Mar. 28, 2019 in International Application PCT/US2018/067684.
Office Action dated Jun. 23, 2020 in U.S. Appl. No. 16/737,449.
International Search Report and Written Opinion dated Mar. 28, 2019 in International Application PCT/US2018/067630.
Office Action dated Sep. 4, 2020 in U.S. Appl. No. 29/669,076.
Office Action dated Jun. 24, 2020 in U.S. Appl. No. 16/233,986.
Office Action dated Jun. 25, 2020 in U.S. Appl. No. 16/234,041.
Notice of Allowance dated Dec. 11, 2020 in U.S. Appl. No. 29/669,076.
Office Action dated Dec. 4, 2020 in U.S. Appl. No. 29/669,078.
Aflac Robot Duck, published Jan. 31, 2018 by Cnet. Https://www.cnet,com/pictures/my-special-aflac-duck-sproutel-robot-for-kids-with-cancer/.
Notice of Allowance dated Mar. 3, 2020 in U.S. Appl. No. 29/669,078.
Notice of Allowance dated Mar. 3, 2020 in U.S. Appl. No. 29/669,155.
International Search Report and Written Opinion dated Mar. 11, 2019 in International Application PCT/US2018/067641.
Notice of Allowance dated May 13, 2019 in Chinese Application 201830624137.3.
Office action dated Mar. 11, 2019 in Chinese Application 201830624137.3.
Office action dated Mar. 1, 2019 in Chinese Application 201830621888.X.
Office action dated Mar. 1, 2019 in Chinese Application 201830621681.2.
International Search Report and Written Opinion dated Mar. 22, 2019 in International Application PCT/US2018/067649.
International Search Report and Written Opinion dated Apr. 1, 2019 in International Application PCT/US2018/067680.
International Preliminary Report on Patentability dated Aug. 27, 2020 in International Application PCT/US2018/067666.
International Search Report and Written Opinion dated Mar. 28, 2019 in International Application PCT/US2018/067666.
International Search Report and Written Opinion dated Mar. 22, 2019 in International Application PCT/US2018/067654.
Office Action dated Jan. 13, 2021 in U.S. Appl. No. 16/737,449.
Notice of Allowance dated Jan. 14, 2021 in U.S. Appl. No. 16/233,786.
Notice of Allowance dated Jan. 6, 2021 in U.S. Appl. No. 16/233,986.
Office Action dated Jan. 28, 2021 in U.S. Appl. No. 16/233,640.
Office Action dated Feb. 3, 2021 in U.S. Appl. No. 16/233,678.
Office Action dated Feb. 3, 2021 in U.S. Appl. No. 16/233,716.
Office Action dated Mar. 2, 2021 in U.S. Appl. No. 16/234,041.

* cited by examiner

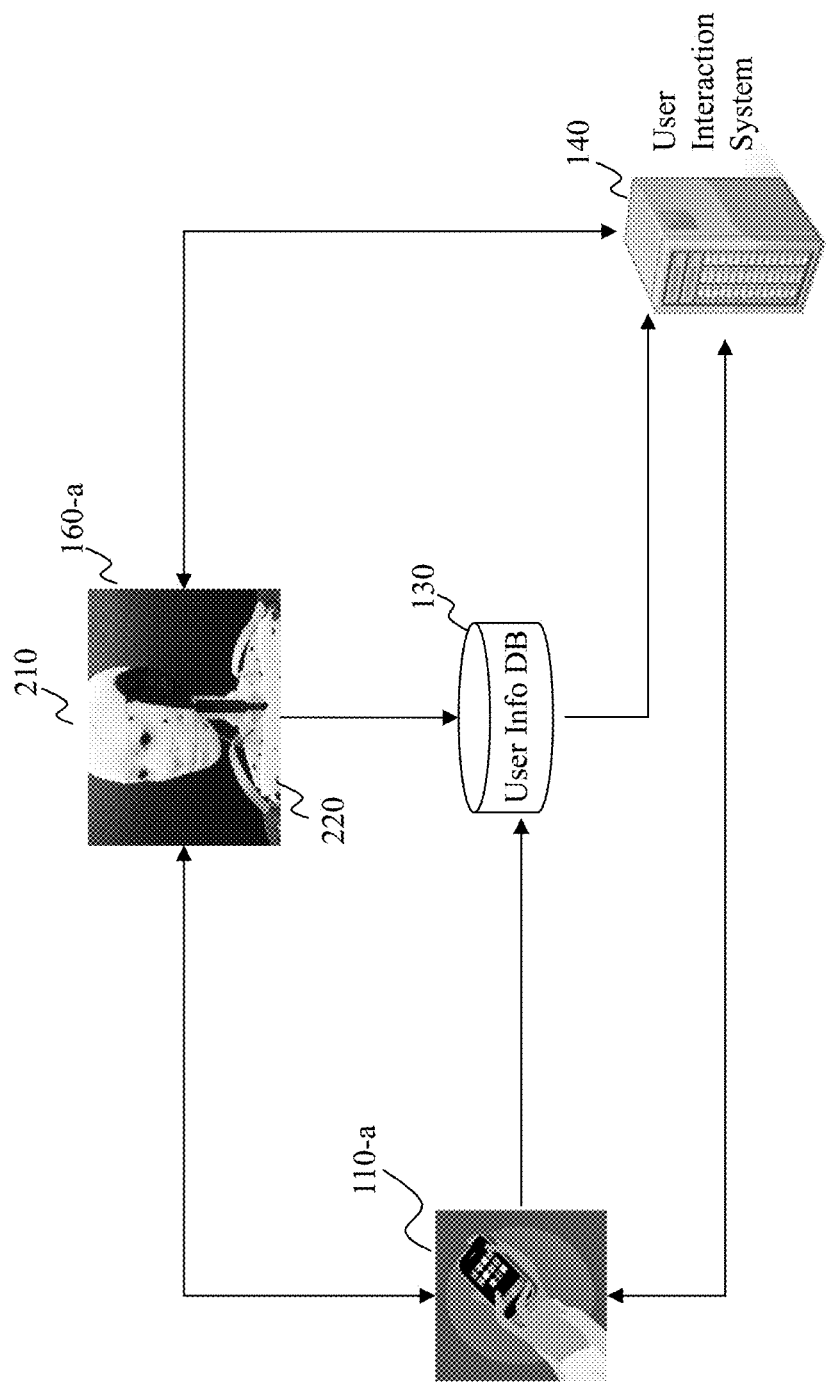

Example of CI-AOG

SYSTEM AND METHOD FOR DIALOGUE MANAGEMENT

CROSS-REFERENCE TO RELATED APPLICATIONS

This application claims priority to U.S. provisional application number 62/612,108, filed Dec. 29, 2017, the contents of which are incorporated herein by reference in its entirety.

The present application is related to U.S. patent application Ser. No. 16/233,539, filed Dec. 27, 2018, International Application No. PCT/US2018/067630, filed Dec. 27, 2018, U.S. patent application Ser. No. 16/233,566, filed Dec. 27, 2018, International Application No. PCT/US2018/067634, filed Dec. 27, 2018, U.S. patent application Ser. No. 16/233,640, filed Dec. 27, 2018, International Application No. PCT/US2018/067641, filed Dec. 27, 2018, U.S. patent application Ser. No. 16/233,678, filed Dec. 27, 2018, International Application No. PCT/US2018/067649, filed Dec. 27, 2018, U.S. patent application Ser. No. 16/233,716, filed Dec. 27, 2018, International Application No. PCT/US2018/067654, filed Dec. 27, 2018, U.S. patent application Ser. No. 16/233,786, filed Dec. 27, 2018, International Application No. PCT/US2018/067666, filed Dec. 27, 2018. International Application No. PCT/US2018/067672, filed Dec. 27, 2018, U.S. patent application Ser. No. 16/233,879, filed Dec. 27, 2018, International Application No. PCT/US2018/067680, filed Dec. 27, 2018, U.S. patent application Ser. No. 16/233,939, filed Dec. 27, 2018, International Application No. PCT/US2018/067684, filed Dec. 27, 2018, U.S. patent application Ser. No. 16/233,986, filed Dec. 27, 2018, International Application No. PCT/US2018/067690, filed Dec. 27, 2018, U.S. patent application Ser. No. 16/234,041, filed Dec. 27, 2018, and International Application No. PCT/US2018/067695, filed Dec. 27, 2018, which are hereby incorporated by reference in their entireties.

BACKGROUND

1. Technical Field

The present teaching generally relates to a computer. More specifically, the present teaching relates to a computerized intelligent agent.

2. Technical Background

With advancement of artificial intelligence technologies and the explosion Internet based communications because of the ubiquitous Internet's connectivity, computer aided dialogue systems have become increasingly popular. For example, more and more call centers deploy automated dialogue robots to handle customer calls. Hotels started to install various kiosks that can answer questions from tourists or guests. Online bookings (whether travel accommodations or theater tickets, etc.) are also more frequently done by chatbots. In recent years, automated human machine communications in other areas are also becoming more and more popular.

Such traditional computer aided dialogue systems are usually pre-programed with certain questions and answers based on commonly known patterns of conversations in different domains. Unfortunately, human conversant can be unpredictable and sometimes does not follow a pre-planned dialogue pattern. In addition, in certain situations, a human conversant may digress during the process and continuing a fixed conversation pattern will likely cause irritation or loss of interests. When this happens, such machine traditional dialogue systems often will not be able to continue to engage a human conversant so that the human machine dialogue either has to be aborted to hand the tasks to a human operator or the human conversant simply leaves the dialogue, which is undesirable.

In addition, traditional machine-based dialogue systems are often not designed to address the emotional factor of a human, let alone taking into consideration as to how to address such emotional factor when conversing with a human. For example, a traditional machine dialogue system usually does not initiate the conversation unless a human activates the system or asks some questions. Even if a traditional dialogue system does initiate a conversation, it has a fixed way to start a conversation and does not change from human to human or adjusted based on observations. As such, although they are programmed to faithfully follow the pre-designed dialogue pattern, they are usually not able to act on the dynamics of the conversation and adapt in order to keep the conversation going in a way that can engage the human. In many situations, when a human involved in a dialogue is clearly annoyed or frustrated, traditional machine dialogue systems are completely unaware and continue the conversation in the same manner that has annoyed the human. This not only makes the conversation end unpleasantly (the machine is still unaware of that) but also turns the person away from conversing with any machine-based dialogue system in the future.

In some applications, conducting a human machine dialogue session based on what is observed from the human is crucially important in order to determine how to proceed effectively. One example is an education related dialogue. When a chatbot is used for teaching a child to read, whether the child is perceptive to the way he/she is being taught has to be monitored and addressed continuously in order to be effective. Another limitation of the traditional dialogue systems is their context unawareness. For example, a traditional dialogue system is not equipped with the ability to observe the context of a conversation and improvise as to dialogue strategy in order to engage a user and improve the user experience.

Thus, there is a need for methods and systems that address such limitations.

SUMMARY

The teachings disclosed herein relate to methods, systems, and programming for a computerized intelligent agent.

In one example, a method, implemented on a machine having at least one processor, storage, and a communication platform capable of connecting to a network for user machine dialogue. An instruction is received by an agent device for rendering a communication directed to a user involved in a dialogue in a dialogue scene and is used to render the communication. A first representation of a mindset of the agent is updated accordingly after the rendering. Input data are received in one or more media types capturing a response from the user and information surrounding the dialogue scene and a second representation of a mindset of the user is updated based on the response from the user and the information surrounding of the dialogue scene. A next communication to the user is then determined based on the first representation of the mindset of the agent and the second representation of the mindset of the user.

In a different example, a system for user machine dialogue is disclosed, which includes an agent device, a user interaction engine, and a dialogue manager. The agent device is configured for receiving an instruction by an agent device for rendering a communication directed to a user involved in a dialogue in a dialogue scene and rendering the communication based on the instruction and for receiving input data in one or more media types capturing a response from the user and information surrounding the dialogue scene. The user interaction engine is configured for updating a first representation of a mindset of the agent after the rendering, and updating a second representation of a mindset of the user based on the response from the user and the information surrounding of the dialogue scene. The dialogue manager is configured for determining a next communication directed to the user in response to the response from the user based on the first representation of the mindset of the agent and the second representation of the mindset of the user.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for user machine dialogue, wherein the medium, when read by the machine, causes the machine to perform a series of steps. An instruction is received by an agent device for rendering a communication directed to a user involved in a dialogue in a dialogue scene and is used to render the communication. A first representation of a mindset of the agent is updated accordingly after the rendering. Input data are received in one or more media types capturing a response from the user and information surrounding the dialogue scene and a second representation of a mindset of the user is updated based on the response from the user and the information surrounding of the dialogue scene. A next communication to the user is then determined based on the first representation of the mindset of the agent and the second representation of the mindset of the user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 2A-2B depict connections among a user device, an agent device, and a user interaction engine during a dialogue, in accordance with an embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional human machine dialogue systems and to provide methods and systems that enables a more effective and realistic human to machine dialogue. The present teaching incorporates artificial intelligence in an automated companion with an agent device in conjunction with the backbone support from a user interaction engine so that the automated companion can conduct a dialogue based on continuously monitored multimodal data indicative of the surrounding of the dialogue, adaptively estimating the mindset/emotion/intent of the participants of the dialogue, and adaptively adjust the conversation strategy based on the dynamically changing information/estimates/contextual information.

The automated companion according to the present teaching is capable of personalizing a dialogue by adapting in multiple fronts, including, but not limited to, the subject matter of the conversation, the hardware/components used to carry out the conversation, and the expression/behavior/gesture used to deliver responses to a human conversant. The adaptive control strategy is to make the conversation more realistic and productive by flexibly changing the conversation strategy based on observations on how receptive the human conversant is to the dialogue. The dialogue system according to the present teaching can be configured to achieve a goal driven strategy, including dynamically configuring hardware/software components that are considered most appropriate to achieve an intended goal. Such optimizations are carried out based on learning, including learning from prior conversations as well as from an on-going conversation by continuously assessing a human conversant's behavior/reactions during the conversation with respect to some intended goals. Paths exploited to achieve a goal driven strategy may be determined to maintain the human conversant engaged in the conversation even though in some instances, paths at some moments of time may appear to be deviating from the intended goal.

Figure 1:
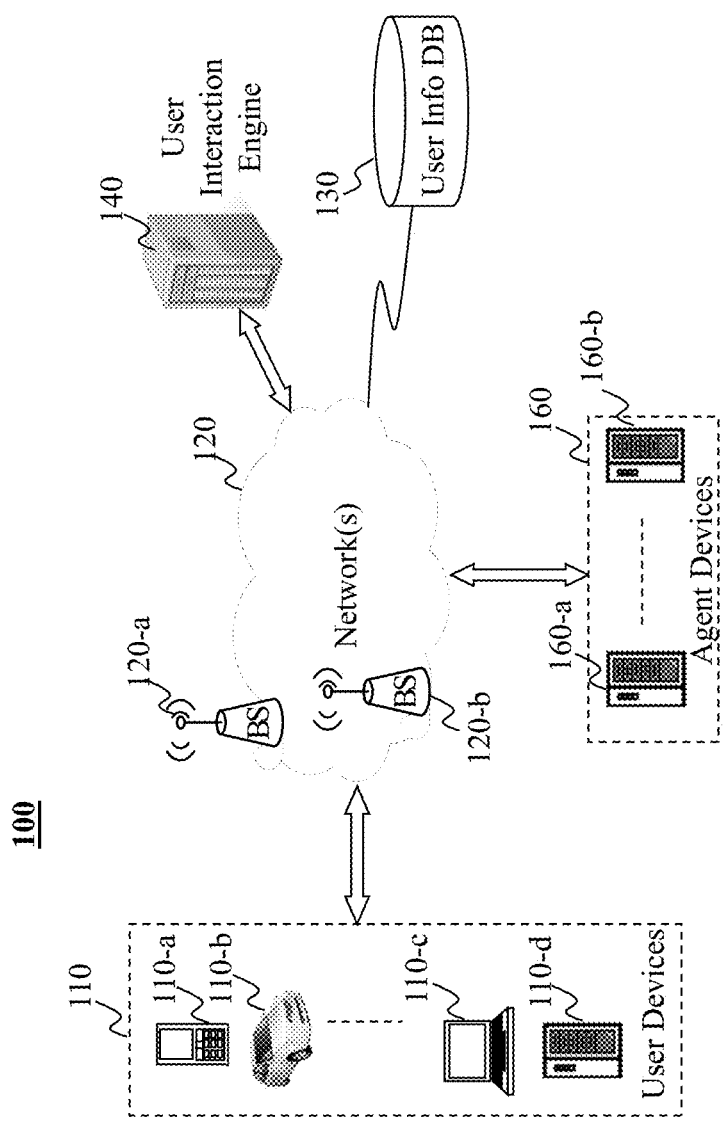
FIG. 1 depicts a networked environment for facilitating a dialogue between a user operating a user device and an agent device in conjunction with a user interaction engine, in accordance with an embodiment of the present teaching.

More specifically, the present teaching discloses a user interaction engine providing backbone support to an agent device to facilitate more realistic and more engaging dialogues with a human conversant. FIG. 1 depicts a networked environment 100 for facilitating a dialogue between a user operating a user device and an agent device in conjunction with a user interaction engine, in accordance with an embodiment of the present teaching. In FIG. 1, the exemplary networked environment 100 includes one or more user devices 110, such as user devices 110-a, 110-b, 110-c, and 110-d, one or more agent devices 160, such as agent devices 160-a, . . . 160-b, a user interaction engine 140, and a user information database 130, each of which may communicate with one another via network 120. In some embodiments, network 120 may correspond to a single network or a combination of different networks. For example, network 120 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 120 may also include various network access points. For example, environment 100 may include wired or wireless access points such as, without limitation, base stations or Internet exchange points 120-a, . . . , 120-b. Base stations 120-a and 120-b may facilitate, for example, communications to/from user devices 110 and/or agent devices 160 with one or more other components in the networked framework 100 across different types of network.

A user device, e.g., 110-a, may be of different types to facilitate a user operating the user device to connect to network 120 and transmit/receive signals. Such a user device 110 may correspond to any suitable type of electronic/computing device including, but not limited to, a mobile device (110-a), a device incorporated in a transportation vehicle (110-b), a mobile computer (110-c), or a stationary device/computer (110-d). A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.).

An agent device, e.g., any of 160-a, . . . , 160-b, may correspond one of different types of devices that may communicate with a user device and/or the user interaction engine 140. Each agent device, as described in greater detail below, may be viewed as an automated companion device that interfaces with a user with, e.g., the backbone support from the user interaction engine 140. An agent device as described herein may correspond to a robot which can be a game device, a toy device, a designated agent device such as a traveling agent or weather agent, etc. The agent device as disclosed herein is capable of facilitating and/or assisting in interactions with a user operating user device. In doing so, an agent device may be configured as a robot capable of controlling some of its parts, via the backend support from the user interaction engine 140, for, e.g., making certain physical movement (such as head), exhibiting certain facial expression (such as curved eyes for a smile), or saying things in a certain voice or tone (such as exciting tones) to display certain emotions.

When a user device (e.g., user device 110-a) is connected to an agent device, e.g., 160-a (e.g., via either a contact or contactless connection), a client running on a user device, e.g., 110-a, may communicate with the automated companion (either the agent device or the user interaction engine or both) to enable an interactive dialogue between the user operating the user device and the agent device. The client may act independently in some tasks or may be controlled remotely by the agent device or the user interaction engine 140. For example, to respond to a question from a user, the agent device or the user interaction engine 140 may control the client running on the user device to render the speech of the response to the user. During a conversation, an agent device may include one or more input mechanisms (e.g., cameras, microphones, touch screens, buttons, etc.) that allow the agent device to capture inputs related to the user or the local environment associated with the conversation. Such inputs may assist the automated companion to develop an understanding of the atmosphere surrounding the conversation (e.g., movements of the user, sound of the environment) and the mindset of the human conversant (e.g., user picks up a ball which may indicate that the user is bored) in order to enable the automated companion to react accordingly and conduct the conversation in a manner that will keep the user interested and engaging.

In the illustrated embodiments, the user interaction engine 140 may be a backend server, which may be centralized or distributed. It is connected to the agent devices and/or user devices. It may be configured to provide backbone support to agent devices 160 and guide the agent devices to conduct conversations in a personalized and customized manner. In some embodiments, the user interaction engine 140 may receive information from connected devices (either agent devices or user devices), analyze such information, and control the flow of the conversations by sending instructions to agent devices and/or user devices. In some embodiments, the user interaction engine 140 may also communicate directly with user devices, e.g., providing dynamic data, e.g., control signals for a client running on a user device to render certain responses.

Generally speaking, the user interaction engine 140 may control the state and the flow of conversations between users and agent devices. The flow of each of the conversations may be controlled based on different types of information associated with the conversation, e.g., information about the user engaged in the conversation (e.g., from the user information database 130), the conversation history, information related to the conversations, and/or the real time user feedbacks. In some embodiments, the user interaction engine 140 may be configured to obtain various sensory inputs such as, and without limitation, audio inputs, image inputs, haptic inputs, and/or contextual inputs, process these inputs, formulate an understanding of the human conversant, accordingly generate a response based on such understanding, and control the agent device and/or the user device to carry out the conversation based on the response. As an illustrative example, the user interaction engine 140 may receive audio data representing an utterance from a user operating the user device, and generate a response (e.g., text) which may then be delivered to the user in the form of a computer generated utterance as a response to the user. As yet another example, the user interaction engine 140 may also, in response to the utterance, generate one or more instructions that control an agent device to perform a particular action or set of actions.

As illustrated, during a human machine dialogue, a user, as the human conversant in the dialogue, may communicate across the network 120 with an agent device or the user interaction engine 140. Such communication may involve data in multiple modalities such as audio, video, text, etc. Via a user device, a user can send data (e.g., a request, audio signal representing an utterance of the user, or a video of the scene surrounding the user) and/or receive data (e.g., text or audio response from an agent device). In some embodiments, user data in multiple modalities, upon being received by an agent device or the user interaction engine 140, may be analyzed to understand the human user's speech or gesture so that the user's emotion or intent may be estimated and used to determine a response to the user.

FIG. 2A depicts specific connections among a user device 110-*a*, an agent device 160-*a*, and the user interaction engine 140 during a dialogue, in accordance with an embodiment of the present teaching. As seen, connections between any two of the parties may all be bi-directional, as discussed herein. The agent device 160-*a* may interface with the user via the user device 110-*a* to conduct a dialogue in a bi-directional manner. On one hand, the agent device 160-*a* may be controlled by the user interaction engine 140 to utter a response to the user operating the user device 110-*a*. On the other hand, inputs from the user site, including, e.g., both the user's utterance or action as well as information about the surrounding of the user, are provided to the agent device via the connections. The agent device 160-*a* may be configured to process such input and dynamically adjust its response to the user. For example, the agent device may be instructed by the user interaction engine 140 to render a tree on the user device. Knowing that the surrounding environment of the user (based on visual information from the user device) shows green trees and lawns, the agent device may customize the tree to be rendered as a lush green tree. If the scene from the user site shows that it is a winter weather, the agent device may control to render the tree on the user device with parameters for a tree that has no leaves. As another example, if the agent device is instructed to render a duck on the user device, the agent device may retrieve information from the user information database 130 on color preference and generate parameters for customizing the duck in a user's preferred color before sending the instruction for the rendering to the user device.

In some embodiments, such inputs from the user's site and processing results thereof may also be transmitted to the user interaction engine 140 for facilitating the user interaction engine 140 to better understand the specific situation associated with the dialogue so that the user interaction engine 140 may determine the state of the dialogue, emotion/mindset of the user, and generate a response that is based on the specific situation of the dialogue and the intended purpose of the dialogue (e.g., for teaching a child the English vocabulary). For example, if information received from the user device indicates that the user appears to be bored and impatient, the user interaction engine 140 may determine to change the state of dialogue to a topic that is of interest of the user (e.g., based on the information from the user information database 130) in order to continue to engage the user in the conversation.

In some embodiments, a client running on the user device may be configured to be able to process raw inputs of different modalities acquired from the user site and send the processed information (e.g., relevant features of the raw inputs) to the agent device or the user interaction engine for further processing. This will reduce the amount of data transmitted over the network and enhance the communication efficiency. Similarly, in some embodiments, the agent device may also be configured to be able to process information from the user device and extract useful information for, e.g., customization purposes. Although the user interaction engine 140 may control the state and flow control of the dialogue, making the user interaction engine 140 light weight improves the user interaction engine 140 scale better.

Figure 2B:
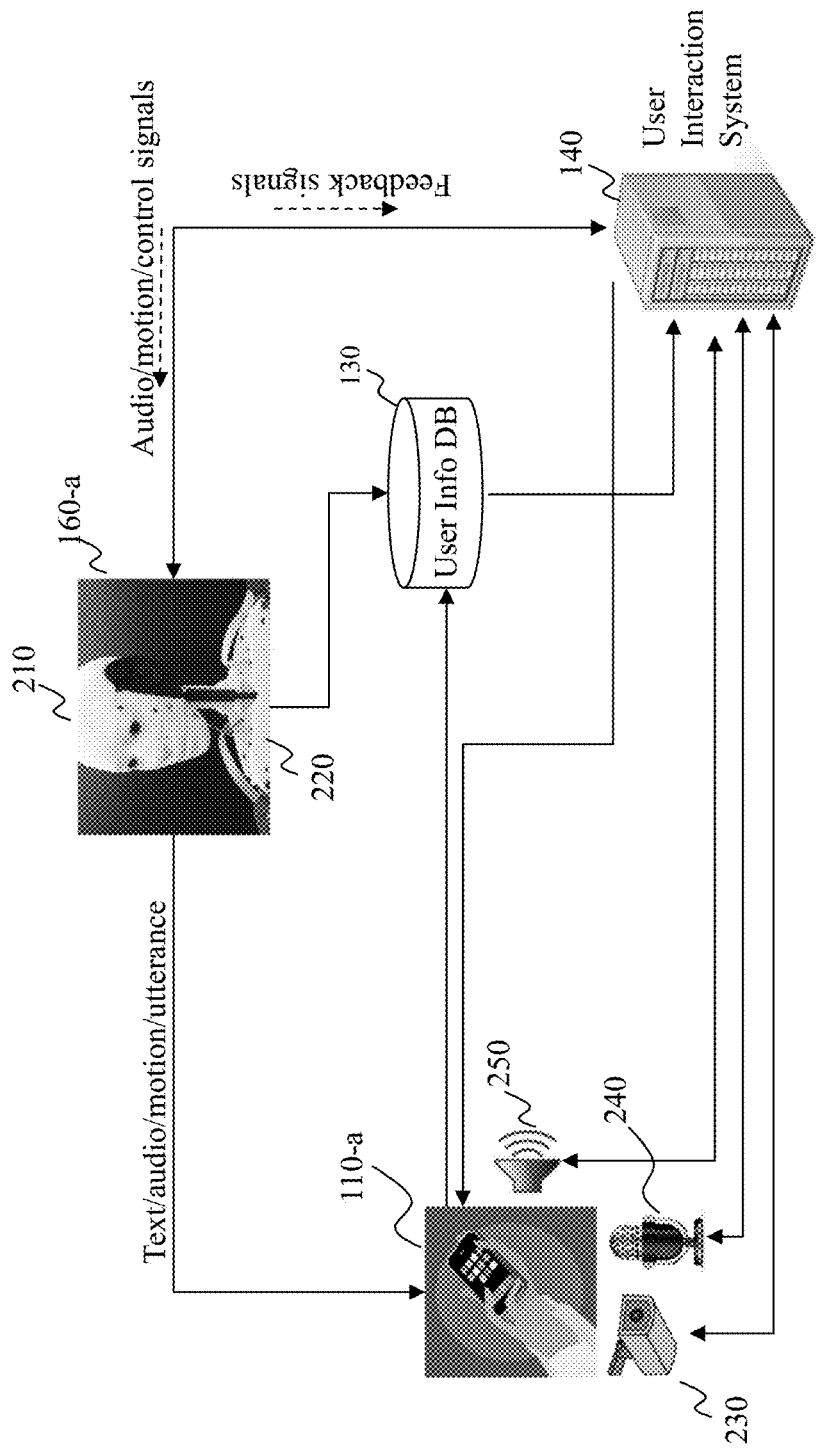

FIG. 2B depicts the same setting as what is presented in FIG. 2A with additional details on the user device 110-*a*. As shown, during a dialogue between the user and the agent 210, the user device 110-*a* may continually collect multi-modal sensor data related to the user and his/her surroundings, which may be analyzed to detect any information related to the dialogue and used to intelligently control the dialogue in an adaptive manner. This may further enhance the user experience or engagement. FIG. 2B illustrates exemplary sensors such as video sensor 230, audio sensor 240, . . . , or haptic sensor 250. The user device may also send textual data as part of the multi-model sensor data. Together, these sensors provide contextual information surrounding the dialogue and can be used by the user interaction system 140 to understand the situation in order to manage the dialogue. In some embodiment, the multi-modal sensor data may first be processed on the user device and important features in different modalities may be extracted and sent to the user interaction system 140 so that dialogue may be controlled with an understanding of the context. In some embodiments, the raw multi-modal sensor data may be sent directly to the user interaction system 140 for processing.

Figure 3A:
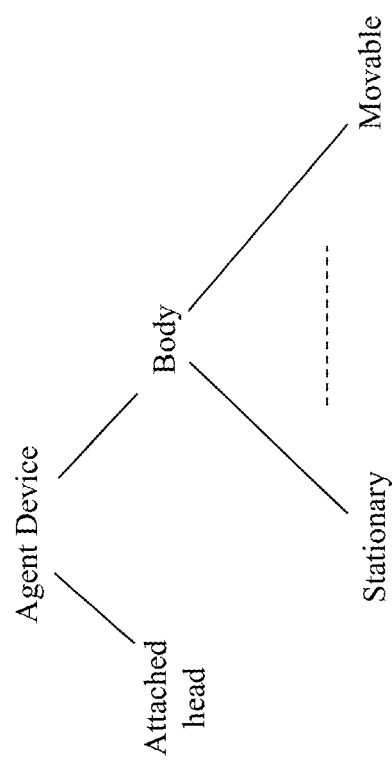
FIG. 3A illustrates an exemplary structure of an agent device with exemplary types of agent body, in accordance with an embodiment of the present teaching.

As shown in FIGS. 2A-2B, the agent device may correspond to a robot that has different parts, including its head 210 and its body 220. Although the agent device as illustrated in FIGS. 2A-2B appears to be a person robot, it may also be constructed in other forms as well, such as a duck, a bear, a rabbit, etc. FIG. 3A illustrates an exemplary structure of an agent device with exemplary types of agent body, in accordance with an embodiment of the present teaching. As presented, an agent device may include a head and a body with the head attached to the body. In some embodiments, the head of an agent device may have additional parts such as face, nose and mouth, some of which may be controlled to, e.g., make movement or expression. In some embodiments, the face on an agent device may correspond to a display screen on which a face can be rendered, and the face may be of a person or of an animal. Such displayed face may also be controlled to express emotion.

The body part of an agent device may also correspond to different forms such as a duck, a bear, a rabbit, etc. The body of the agent device may be stationary, movable, or semi-movable. An agent device with stationary body may correspond to a device that can sit on a surface such as a table to conduct face to face conversation with a human user sitting next to the table. An agent device with movable body may correspond to a device that can move around on a surface such as table surface or floor. Such a movable body may include parts that can be kinematically controlled to make physical moves. For example, an agent body may include feet which can be controlled to move in space when needed. In some embodiments, the body of an agent device may be semi-movable, i.e., some parts are movable and some are not. For example, a tail on the body of an agent device with a duck appearance may be movable but the duck cannot move in space. A bear body agent device may also have arms that may be movable but the bear can only sit on a surface.

Figure 3B:
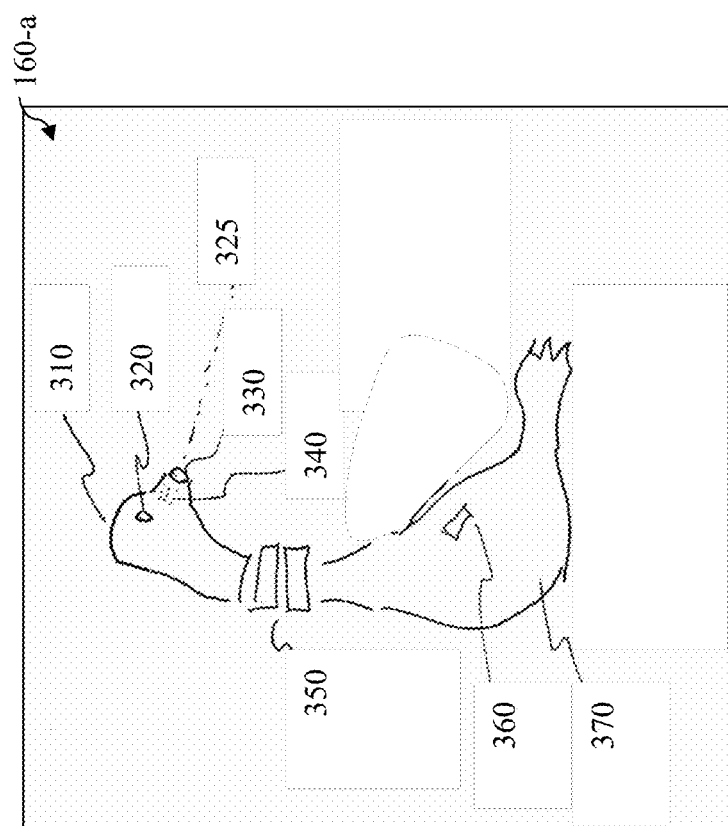
FIG. 3B illustrates an exemplary agent device, in accordance with an embodiment of the present teaching.

FIG. 3B illustrates an exemplary agent device or automated companion 160-*a*, in accordance with an embodiment of the present teaching. The automated companion 160-*a* is a device that interacts with people using speech and/or facial expression or physical gestures. For example, the automated companion 160-*a* corresponds to an animatronic peripheral device with different parts, including head portion 310, eye portion (cameras) 320, a mouth portion with laser 325 and a microphone 330, a speaker 340, neck portion with servos 350, one or more magnet or other components that can be used for contactless detection of presence 360, and a body portion corresponding to, e.g., a charge base 370. In operation, the automated companion 160-*a* may be connected to a user device which may include a mobile multi-function device (110-*a*) via network connections. Once connected, the automated companion 160-*a* and the user device interact with each other via, e.g., speech, motion, gestures, and/or via pointing with a laser pointer.

Other exemplary functionalities of the automated companion 160-*a* may include reactive expressions in response to a user's response via, e.g., an interactive video cartoon character (e.g., avatar) displayed on, e.g., a screen as part of a face on the automated companion. The automated companion may use a camera (320) to observe the user's presence, facial expressions, direction of gaze, surroundings, etc. An animatronic embodiment may "look" by pointing its head (310) containing a camera (320), "listen" using its microphone (340), "point" by directing its head (310) that can move via servos (350). In some embodiments, the head of the agent device may also be controlled remotely by a, e.g., the user interaction system 140 or by a client in a user device (110-*a*), via a laser (325). The exemplary automated companion 160-*a* as shown in FIG. 3B may also be controlled to "speak" via a speaker (330).

Figure 4A:
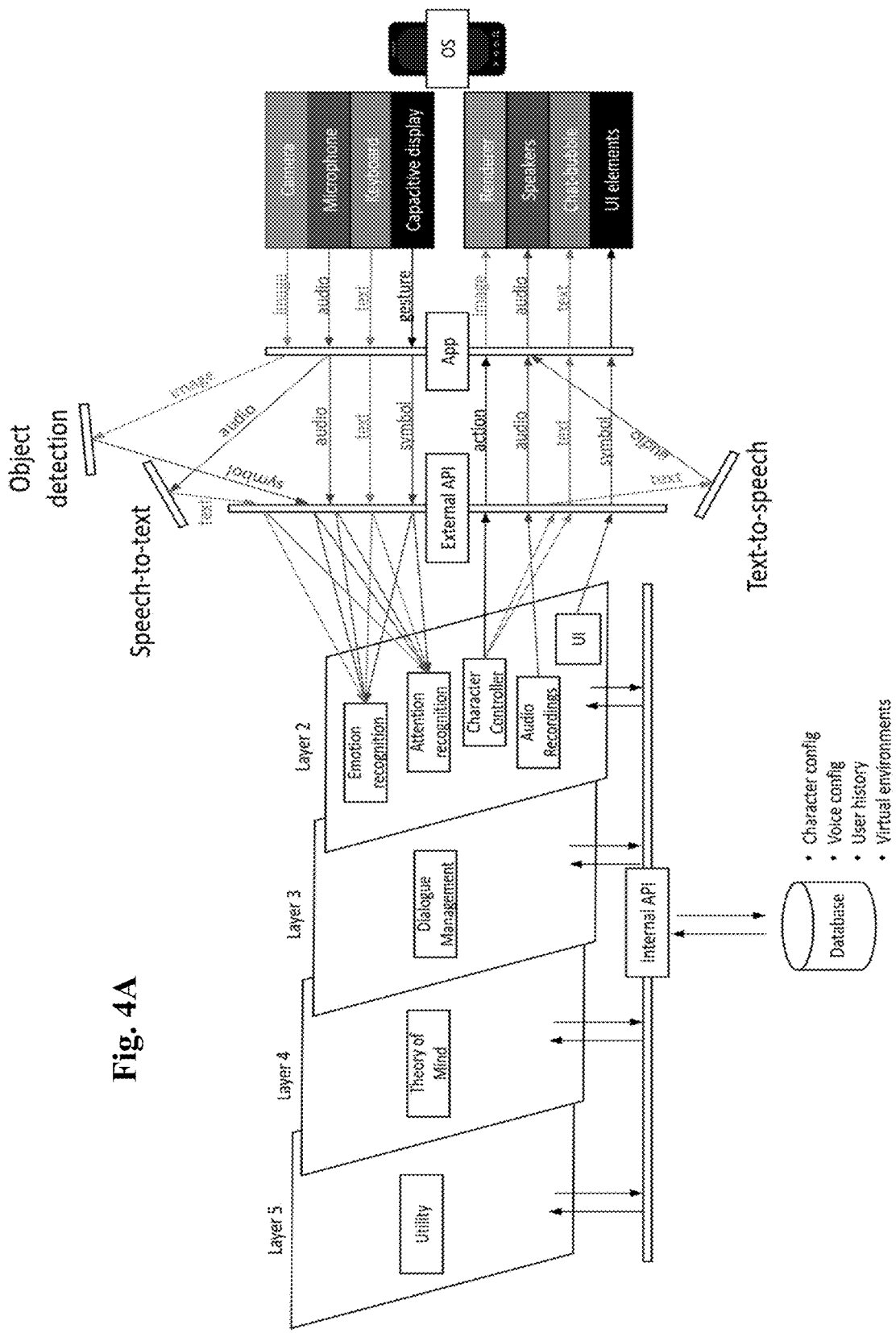
FIG. 4A depicts an exemplary high level system diagram for an overall system for the automated companion, according to various embodiments of the present teaching.

FIG. 4A depicts an exemplary high level system diagram for an overall system for the automated companion, according to various embodiments of the present teaching. In this illustrated embodiment, the overall system may encompass components/function modules residing in a user device, an agent device, and the user interaction engine 140. The overall system as depicted herein comprises a plurality of layers of processing and hierarchies that together carries out human-machine interactions in an intelligent manner. In the illustrated embodiment, there are 5 layers, including layer 1 for front end application as well as front end multi-modal data processing, layer 2 for characterizations of the dialog setting, layer 3 in which the dialog management module resides, layer 4 for estimated mindset of different parties (human, agent, device, etc.), layer 5 for so called utility. Different layers may correspond to different levels of processing, ranging from raw data acquisition and processing at layer 1 to processing changing utilities of participants of dialogues in layer 5.

The term "utility" is hereby defined as preferences of a party identified based on states detected associated with dialogue histories. Utility may be associated with a party in a dialogue, whether the party is a human, the automated companion, or other intelligent devices. A utility for a particular party may represent different states of a world, whether physical, virtual, or even mental. For example, a state may be represented as a particular path along which a dialog walks through in a complex map of the world. At different instances, a current state evolves into a next state based on the interaction between multiple parties. States may also be party dependent, i.e., when different parties participate in an interaction, the states arising from such interaction may vary. A utility associated with a party may be organized as a hierarchy of preferences and such a hierarchy of preferences may evolve over time based on the party's choices made and likings exhibited during conversations. Such preferences, which may be represented as an ordered sequence of choices made out of different options, is what is referred to as utility. The present teaching discloses method and system by which an intelligent automated companion is capable of learning, through a dialogue with a human conversant, the user's utility.

Within the overall system for supporting the automated companion, front end applications as well as front end multi-modal data processing in layer 1 may reside in a user device and/or an agent device. For example, the camera, microphone, keyboard, display, renderer, speakers, chat-bubble, and user interface elements may be components or functional modules of the user device. For instance, there may be an application or client running on the user device which may include the functionalities before an external application interface (API) as shown in FIG. 4A. In some embodiments, the functionalities beyond the external API may be considered as the backend system or reside in the user interaction engine 140. The application running on the user device may take multi-model data (audio, images, video, text) from the sensors or circuitry of the user device, process the multi-modal data to generate text or other types of signals (object such as detected user face, speech understanding result) representing features of the raw multi-modal data, and send to layer 2 of the system.

In layer 1, multi-modal data may be acquired via sensors such as camera, microphone, keyboard, display, speakers, chat bubble, renderer, or other user interface elements. Such multi-modal data may be analyzed to estimate or infer various features that may be used to infer higher level characteristics such as expression, characters, gesture, emotion, action, attention, intent, etc. Such higher-level characteristics may be obtained by processing units at layer 2 and then used by components of higher layers, via the internal API as shown in FIG. 4A, to e.g., intelligently infer or estimate additional information related to the dialogue at higher conceptual levels. For example, the estimated emotion, attention, or other characteristics of a participant of a dialogue obtained at layer 2 may be used to estimate the mindset of the participant. In some embodiments, such mindset may also be estimated at layer 4 based on additional information, e.g., recorded surrounding environment or other auxiliary information in such surrounding environment such as sound.

The estimated mindsets of parties, whether related to humans or the automated companion (machine), may be relied on by the dialogue management at layer 3, to determine, e.g., how to carry on a conversation with a human conversant. How each dialogue progresses often represents a human user's preferences. Such preferences may be captured dynamically during the dialogue at utilities (layer 5). As shown in FIG. 4A, utilities at layer 5 represent evolving states that are indicative of parties' evolving preferences, which can also be used by the dialogue management at layer 3 to decide the appropriate or intelligent way to carry on the interaction.

Sharing of information among different layers may be accomplished via APIs. In some embodiments as illustrated in FIG. 4A, information sharing between layer 1 and rest of the layers is via an external API while sharing information among layers 2-5 is via an internal API. It is understood that this is merely a design choice and other implementations are also possible to realize the present teaching presented herein. In some embodiments, through the internal API, various layers (2-5) may access information created by or stored at other layers to support the processing. Such information may include common configuration(s) to be applied to a dialogue (e.g., character of the agent device is an avatar, preferred voice, or a virtual environment to be created for the dialogue, etc.), a current state of the dialogue, a current dialogue history, known user preferences, estimated user intent/emotion/mindset, etc. In some embodiments, some information that may be shared via the internal API may be accessed from an external database. For example, certain configurations related to a desired character for the agent device (a duck) may be accessed from, e.g., an open source database, that provides parameters (e.g., parameters to visually render the duck and/or parameters needed to render the speech from the duck).

Figure 4B:
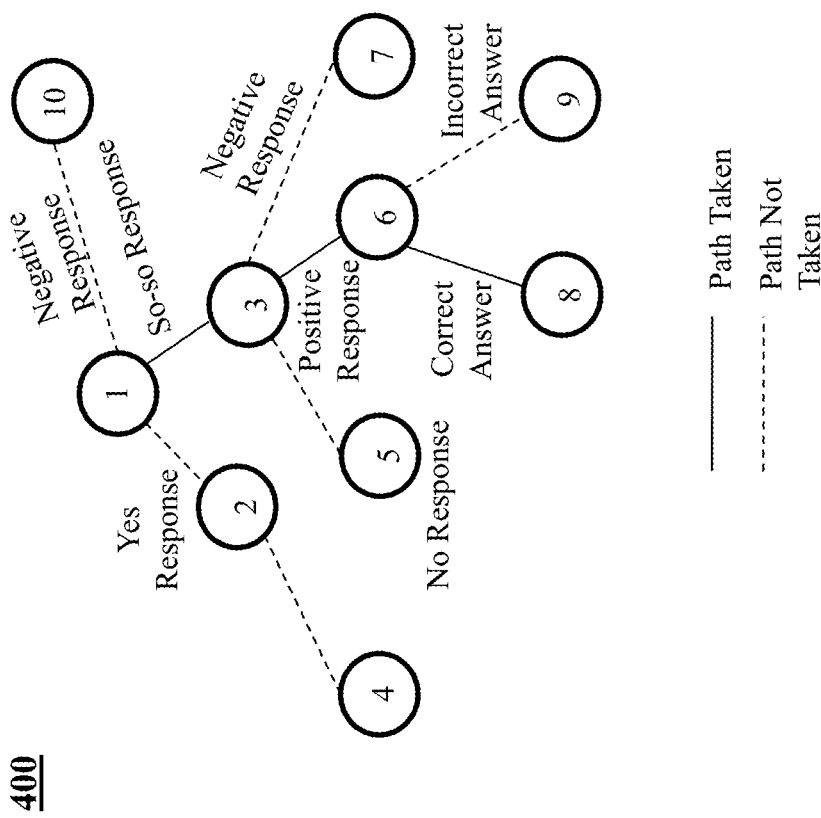
FIG. 4B illustrates a part of a dialogue tree of an on-going dialogue with paths taken based on interactions between the automated companion and a user, according to an embodiment of the present teaching.

FIG. 4B illustrates a part of a dialogue tree of an on-going dialogue with paths taken based on interactions between the automated companion and a user, according to an embodiment of the present teaching. In this illustrated example, the dialogue management at layer 3 (of the automated companion) may predict multiple paths with which a dialogue, or more generally an interaction, with a user may proceed. In this example, each node may represent a point of the current state of the dialogue and each branch from a node may represent possible responses from a user. As shown in this example, at node 1, the automated companion may have three separate paths which may be taken depending on a response detected from a user. If the user responds with an affirmative response, dialogue tree 400 may proceed from node 1 to node 2. At node 2, a response may be generated for the automated companion in response to the affirmative response from the user and may then be rendered to the user, which may include audio, visual, textual, haptic, or any combination thereof.

If, at node 1, the user responds negatively, the path is for this stage is from node 1 to node 10. If the user responds, at node 1, with a "so-so" response (e.g., not negative but also not positive), dialogue tree 400 may proceed to node 3, at which a response from the automated companion may be rendered and there may be three separate possible responses from the user, "No response," "Positive Response," and "Negative response," corresponding to nodes 5, 6, and 7, respectively. Depending on the user's actual response with respect to the automated companion's response rendered at node 3, the dialogue management at layer 3 may then follow the dialogue accordingly. For instance, if the user responds at node 3 with a positive response, the automated companion moves to respond to the user at node 6. Similarly, depending on the user's reaction to the automated companion's response at node 6, the user may further respond with an answer that is correct. In this case, the dialogue state moves from node 6 to node 8, etc. In this illustrated example, the dialogue state during this period moved from node 1, to node 3, to node 6, and to node 8. The traversal through nodes 1, 3, 6, and 8 forms a path consistent with the underlying conversation between the automated companion and a user. As shown in FIG. 4B, the path representing the dialogue is represented by the solid lines connecting nodes 1, 3, 6, and 8, whereas the paths skipped during a dialogue is represented by the dashed lines.

Figure 4C:
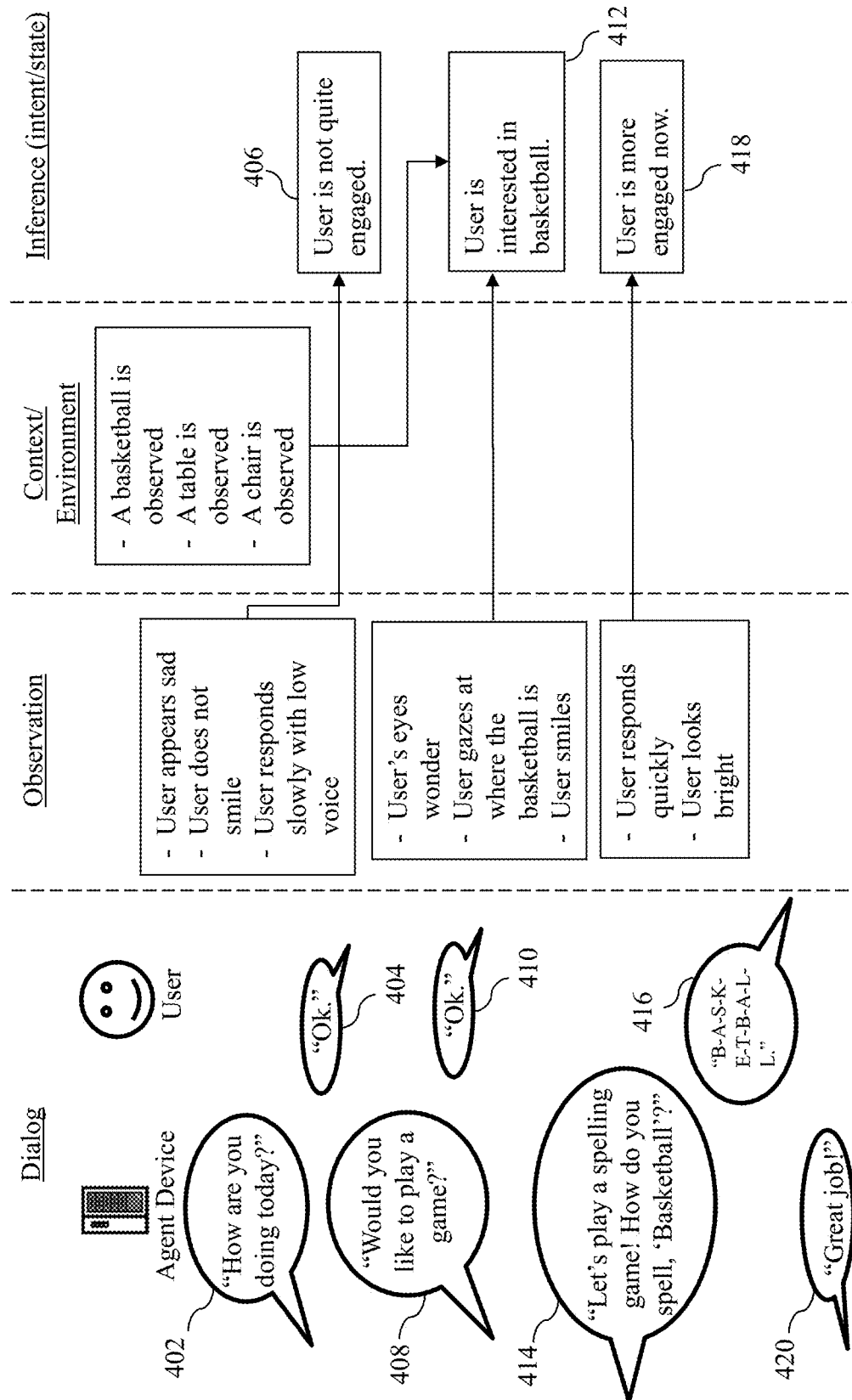
FIG. 4C illustrates exemplary a human-agent device interaction and exemplary processing performed by the automated companion, according to an embodiment of the present teaching.

FIG. 4C illustrates an exemplary human-agent device interaction and exemplary processing performed by the automated companion, according to an embodiment of the present teaching. As shown in FIG. 4C, operations at different layers may be conducted and together they facilitate intelligent dialogue in a cooperated manner. In the illustrated example, an agent device may first ask a user "How are you doing today?" at 402 to initiate a conversation. In response to utterance at 402, the user may respond with utterance "Ok" at 404. To manage the dialogue, the automated companion may activate different sensors during the dialogue to make observation of the user and the surrounding environment. For example, the agent device may acquire multi-modal data about the surrounding environment where the user is in. Such multi-modal data may include audio, visual, or text data. For example, visual data may capture the facial expression of the user. The visual data may also reveal contextual information surrounding the scene of the conversation. For instance, a picture of the scene may reveal that there is a basketball, a table, and a chair, which provides information about the environment and may be leveraged in dialogue management to enhance engagement of the user. Audio data may capture not only the speech response of the user but also other peripheral information such as the tone of the response, the manner by which the user utters the response, or the accent of the user.

Based on acquired multi-modal data, analysis may be performed by the automated companion (e.g., by the front-end user device or by the backend user interaction engine 140) to assess the attitude, emotion, mindset, and utility of the users. For example, based on visual data analysis, the automated companion may detect that the user appears sad, not smiling, the user's speech is slow with a low voice. The characterization of the user's states in the dialogue may be performed at layer 2 based on multi-model data acquired at layer 1. Based on such detected observations, the automated companion may infer (at 406) that the user is not that interested in the current topic and not that engaged. Such inference of emotion or mental state of the user may, for instance, be performed at layer 4 based on characterization of the multi-modal data associated with the user.

To respond to the user's current state (not engaged), the automated companion may determine to perk up the user in order to better engage the user. In this illustrated example, the automated companion may leverage what is available in the conversation environment by uttering a question to the user at 408: "Would you like to play a game?" Such a question may be delivered in an audio form as speech by converting text to speech, e.g., using customized voices individualized for the user. In this case, the user may respond by uttering, at 410, "Ok." Based on the continuously acquired multi-model data related to the user, it may be observed, e.g., via processing at layer 2, that in response to the invitation to play a game, the user's eyes appear to be wandering, and in particular that the user's eyes may gaze towards where the basketball is located. At the same time, the automated companion may also observe that, once hearing the suggestion to play a game, the user's facial expression changes from "sad" to "smiling." Based on such observed characteristics of the user, the automated companion may infer, at 412, that the user is interested in basketball.

Based on the acquired new information and the inference thereof, the automated companion may decide to leverage the basketball available in the environment to make the dialogue more engaging for the user yet still achieving the educational goal for the user. In this case, the dialogue management at layer 3 may adapt the conversion to talk about a game and leverage the observation that the user gazed at the basketball in the room to make the dialogue more interesting to the user yet still achieving the goal of, e.g., educating the user. In one example embodiment, the automated companion generates a response, suggesting the user to play a spelling game" (at 414) and asking the user to spell the word "basketball."

Given the adaptive dialogue strategy of the automated companion in light of the observations of the user and the environment, the user may respond providing the spelling of word "basketball." (at 416). Observations are continuously made as to how enthusiastic the user is in answering the spelling question. If the user appears to respond quickly with a brighter attitude, determined based on, e.g., multi-modal data acquired when the user is answering the spelling question, the automated companion may infer, at 418, that the user is now more engaged. To further encourage the user to actively participate in the dialogue, the automated companion may then generate a positive response "Great job!" with instruction to deliver this response in a bright, encouraging, and positive voice to the user.

Figure 5:
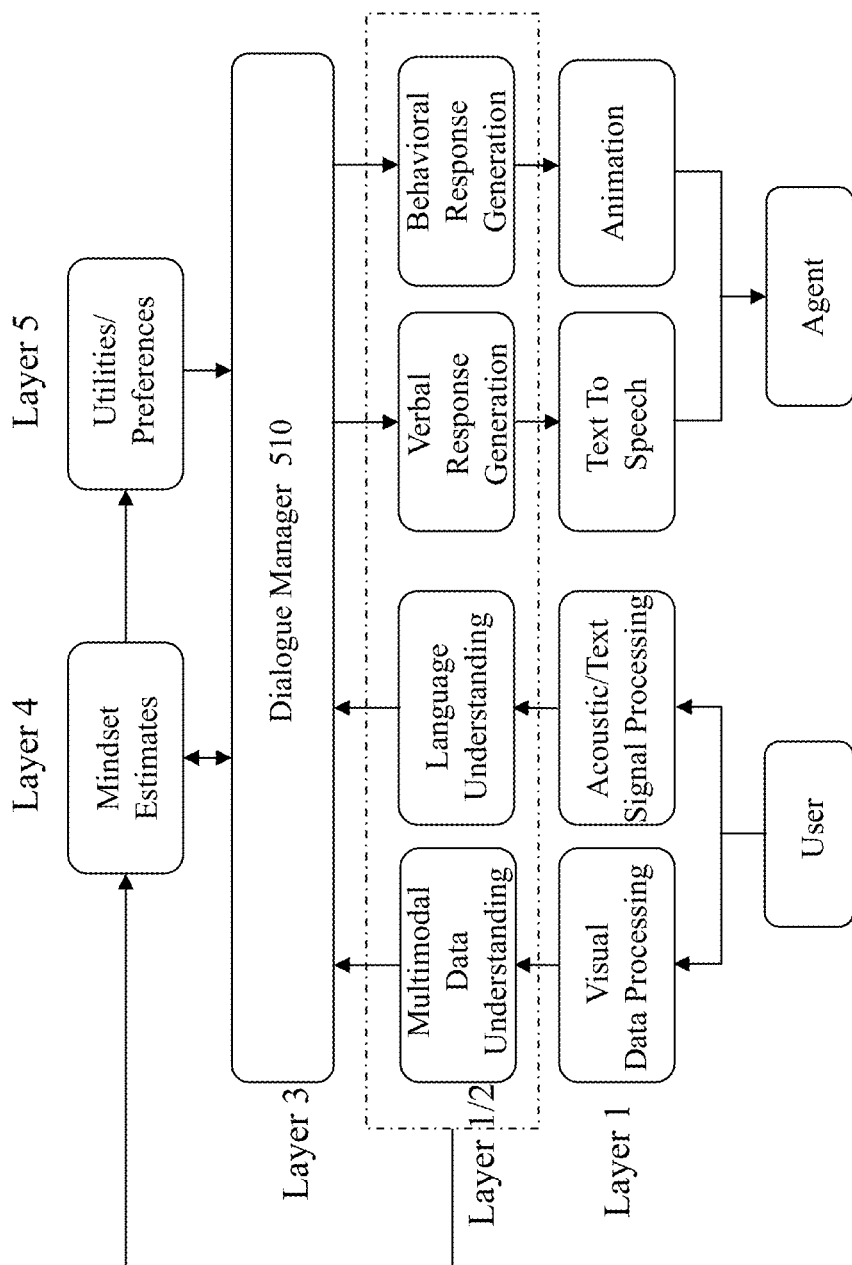
FIG. 5 illustrates exemplary multiple layer processing and communications among different processing layers of an automated dialogue companion, according to an embodiment of the present teaching.

FIG. 5 illustrates exemplary communications among different processing layers of an automated dialogue companion centered around a dialogue manager 510, according to various embodiments of the present teaching. The dialogue manager 510 in FIG. 5 corresponds to a functional component of the dialogue management at layer 3. A dialog manager is an important part of the automated companion and it manages dialogues. Traditionally, a dialogue manager takes in as input a user's utterances and determine how to respond to the user. This is performed without taking into account the user's preferences, user's mindset/emotions/intent, or surrounding environment of the dialogue, i.e., given any weights to the different available states of the relevant world. The lack of an understanding of the surrounding world often limits the perceived authenticity of or engagement in the conversations between a human user and an intelligent agent.

In some embodiments of the present teaching, the utility of parties of a conversation relevant to an on-going dialogue is exploited to allow a more personalized, flexible, and engaging conversion to be carried out. It facilitates an intelligent agent acting in different roles to become more effective in different tasks, e.g., scheduling appointments, booking travel, ordering equipment and supplies, and researching online on various topics. When an intelligent agent is aware of a user's dynamic mindset, emotions, intent, and/or utility, it enables the agent to engage a human conversant in the dialogue in a more targeted and effective way. For example, when an education agent teaches a child, the preferences of the child (e.g., color he loves), the emotion observed (e.g., sometimes the child does not feel like continue the lesson), the intent (e.g., the child is reaching out to a ball on the floor instead of focusing on the lesson) may all permit the education agent to flexibly adjust the focus subject to toys and possibly the manner by which to continue the conversation with the child so that the child may be given a break in order to achieve the overall goal of educating the child.

As another example, the present teaching may be used to enhance a customer service agent in its service by asking questions that are more appropriate given what is observed in real-time from the user and hence achieving improved user experience. This is rooted in the essential aspects of the present teaching as disclosed herein by developing the means and methods to learn and adapt preferences or mindsets of parties participating in a dialogue so that the dialogue can be conducted in a more engaging manner.

Dialogue manager (DM) 510 is a core component of the automated companion. As shown in FIG. 5, DM 510 (layer 3) takes input from different layers, including input from layer 2 as well as input from higher levels of abstraction such as estimated mindsets of parties involved in a dialogue from layer 4 and utilities/preferences from layer 5. As illustrated, at layer 1, multi-modal information is acquired from sensors in different modalities which is processed to, e.g., obtain features that characterize the data. This may include signal processing in visual, acoustic, and textual modalities.

Processed features of the multi-modal data may be further processed at layer 2 to achieve language understanding and/or multi-modal data understanding including visual, textual, and any combination thereof. Some of such understanding may be directed to a single modality, such as speech understanding, and some may be directed to an understanding of the surrounding of the user engaging in a dialogue based on integrated information. Such understanding may be physical (e.g., recognize certain objects in the scene), perceivable (e.g., recognize what the user said, or certain significant sound, etc.), or mental (e.g., certain emotion such as stress of the user estimated based on, e.g., the tune of the speech, a facial expression, or a gesture of the user).

The modal-data understanding generated at layer 2 may be used by DM 510 to determine how to respond. To enhance engagement and user experience, the DM 510 may also determine a response based on the estimated mindsets of the user and of the agent from layer 4 as well as the utilities of the user engaged in the dialogue from layer 5. The mindsets of the parties involved in a dialogue may be estimated based on information from Layer 2 (e.g., estimated emotion of a user) and the progress of the dialogue. In some embodiments, the mindsets of a user and of an agent may be estimated dynamically during the course of a dialogue and such estimated mindsets may then be used to learn, together with other data, utilities of users. The learned utilities represent preferences of users in different dialogue scenarios and are estimated based on historic dialogues and the outcomes thereof.

In each dialogue of a certain topic, the dialogue manager 510 bases its control of the dialogue on relevant dialogue tree(s) that may or may not be associated with the topic (e.g., may inject small talks to enhance engagement). To generate a response to a user in a dialogue, the dialogue manager 510 may also consider additional information such as a state of the user, the surrounding of the dialogue scene, the emotion of the user, the estimated mindsets of the user and the agent, and the known preferences of the user (utilities).

An output of DM 510 corresponds to an accordingly determined response to the user. To deliver a response to the user, the DM 510 may also formulate a way that the response is to be delivered. The form in which the response is to be delivered may be determined based on information from multiple sources, e.g., the user's emotion (e.g., if the user is a child who is not happy, the response may be rendered in a gentle voice), the user's utility (e.g., the user may prefer speech in certain accent similar to his parents'), or the surrounding environment that the user is in (e.g., noisy place so that the response needs to be delivered in a high volume). DM 510 may output the response determined together with such delivery parameters.

In some embodiments, the delivery of such determined response is achieved by generating the deliverable form(s) of each response in accordance with various parameters associated with the response. In a general case, a response is delivered in the form of speech in some natural language. A response may also be delivered in speech coupled with a particular nonverbal expression as a part of the delivered response, such as a nod, a shake of the head, a blink of the eyes, or a shrug. There may be other forms of deliverable form of a response that is acoustic but not verbal, e.g., a whistle.

To deliver a response, a deliverable form of the response may be generated via, e.g., verbal response generation and/or behavior response generation, as depicted in FIG. 5. Such a response in its determined deliverable form(s) may then be used by a renderer to actual render the response in its intended form(s). For a deliverable form in a natural language, the text of the response may be used to synthesize a speech signal via, e.g., text to speech techniques, in accordance with the delivery parameters (e.g., volume, accent, style, etc.). For any response or part thereof, that is to be delivered in a non-verbal form(s), e.g., with a certain expression, the intended non-verbal expression may be translated into, e.g., via animation, control signals that can be used to control certain parts of the agent device (physical representation of the automated companion) to perform certain mechanical movement to deliver the non-verbal expression of the response, e.g., nodding head, shrug shoulders, or whistle. In some embodiments, to deliver a response, certain software components may be invoked to render a different facial expression of the agent device. Such rendition(s) of the response may also be simultaneously carried out by the agent (e.g., speak a response with a joking voice and with a big smile on the face of the agent).

Figure 6:
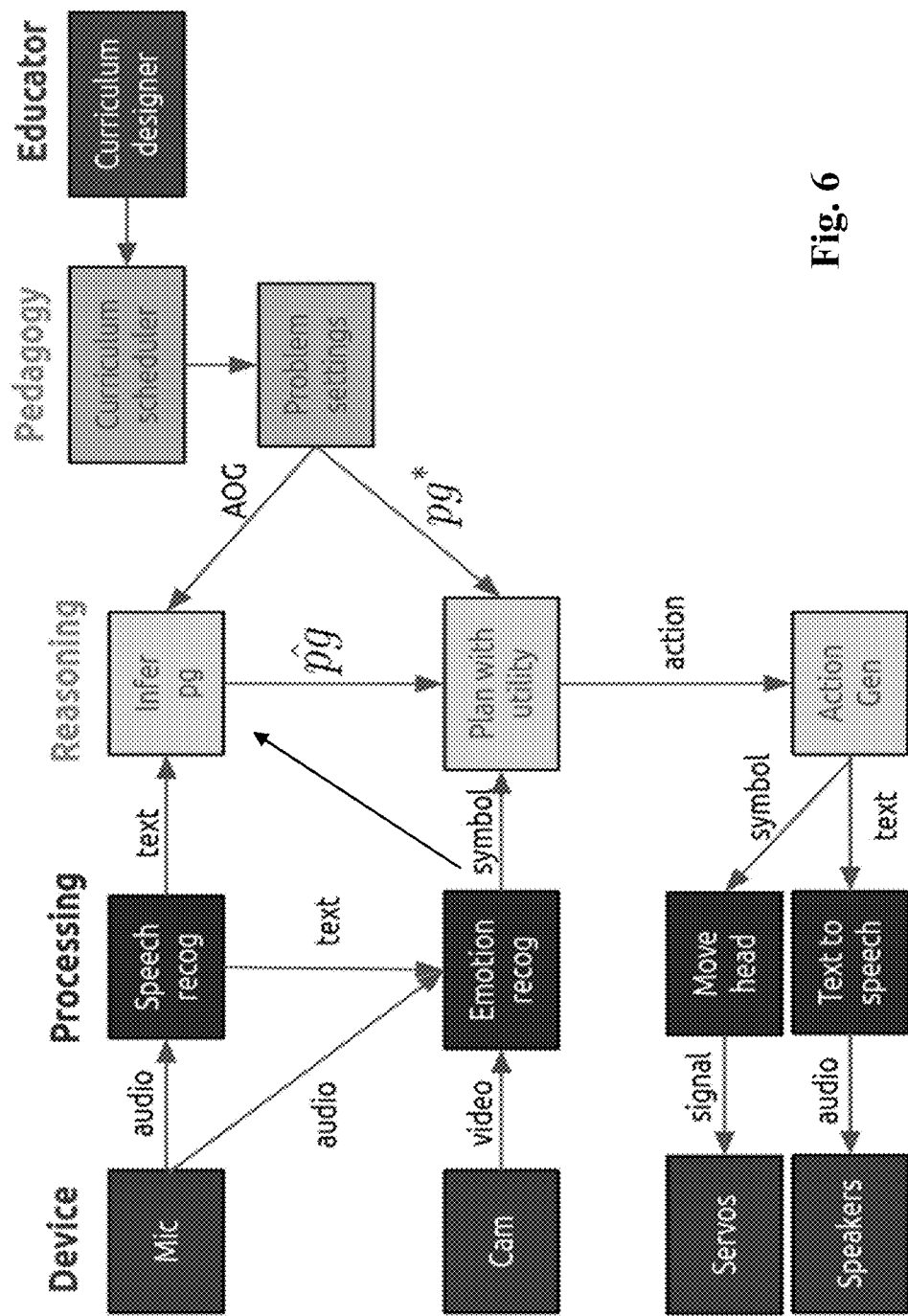
FIG. 6 depicts an exemplary high level system framework for an artificial intelligence based educational companion, according to an embodiment of the present teaching.

FIG. 6 depicts an exemplary high level system diagram for an artificial intelligence based educational companion, according to various embodiments of the present teaching. In this illustrated embodiment, there are five levels of processing, namely device level, processing level, reasoning level, pedagogy or teaching level, and educator level. The device level comprising sensors such as microphone and camera or media delivery devices such as servos to move, e.g., body parts of a robot or speakers to deliver dialogue content. The processing level comprises various processing components directed to processing of different types of signals, which include both input and output signals.

On the input side, the processing level may include speech processing module for performing, e.g., speech recognition based on audio signal obtained from an audio sensor (microphone) to understand what is being uttered in order to determine how to respond. The audio signal may also be recognized to generate text information for further analysis. The audio signal from the audio sensor may also be used by an emotion recognition processing module. The emotion recognition module may be designed to recognize various emotions of a party based on both visual information from a camera and the synchronized audio information. For instance, a happy emotion may often be accompanied with a smile face and a certain acoustic cue. The text information obtained via speech recognition may also be used by the emotion recognition module, as a part of the indication of the emotion, to estimate the emotion involved.

On the output side of the processing level, when a certain response strategy is determined, such strategy may be translated into specific actions to be taken by the automated companion to respond to the other party. Such action may be carried out by either delivering some audio response or expressing certain emotion or attitude via certain gesture. When the response is to be delivered in audio, text with words that need to be spoken are processed by a text to speech module to produce audio signals and such audio signals are then sent to the speakers to render the speech as a response. In some embodiments, the speech generated based on text may be performed in accordance with other parameters, e.g., that may be used to control the generation of the speech with certain tones or voices. If the response is to be delivered as a physical action, such as a body movement realized on the automated companion, the actions to be taken may also be instructions to be used to generate such body movement. For example, the processing level may include a module for moving the head (e.g., nodding, shaking, or other movement of the head) of the automated companion in accordance with some instruction (symbol). To follow the instruction to move the head, the module for moving the head may generate electrical signal, based on the instruction, and send to servos to physically control the head movement.

The third level is the reasoning level, which is used to perform high level reasoning based on analyzed sensor data. Text from speech recognition, or estimated emotion (or other characterization) may be sent to an inference program which may operate to infer various high level concepts such as intent, mindset, preferences based on information received from the second level. The inferred high level concepts may then be used by a utility based planning module that devises a plan to respond in a dialogue given the teaching plans defined at the pedagogy level and the current state of the user. The planned response may then be translated into an action to be performed to deliver the planned response. The action is then further processed by an action generator to specifically direct to different media platform to carry out the intelligent response.

The pedagogy and educator levels both relate to the educational application as disclosed. The educator level includes activities related to designing curriculums for different subject matters. Based on designed curriculum, the pedagogy level includes a curriculum scheduler that schedules courses based on the designed curriculum and based on the curriculum schedule, the problem settings module may arrange certain problems settings be offered based on the specific curriculum schedule. Such problem settings may be used by the modules at the reasoning level to assist to infer the reactions of the users and then plan the response accordingly based on utility and inferred state of mind.

Figure 7:
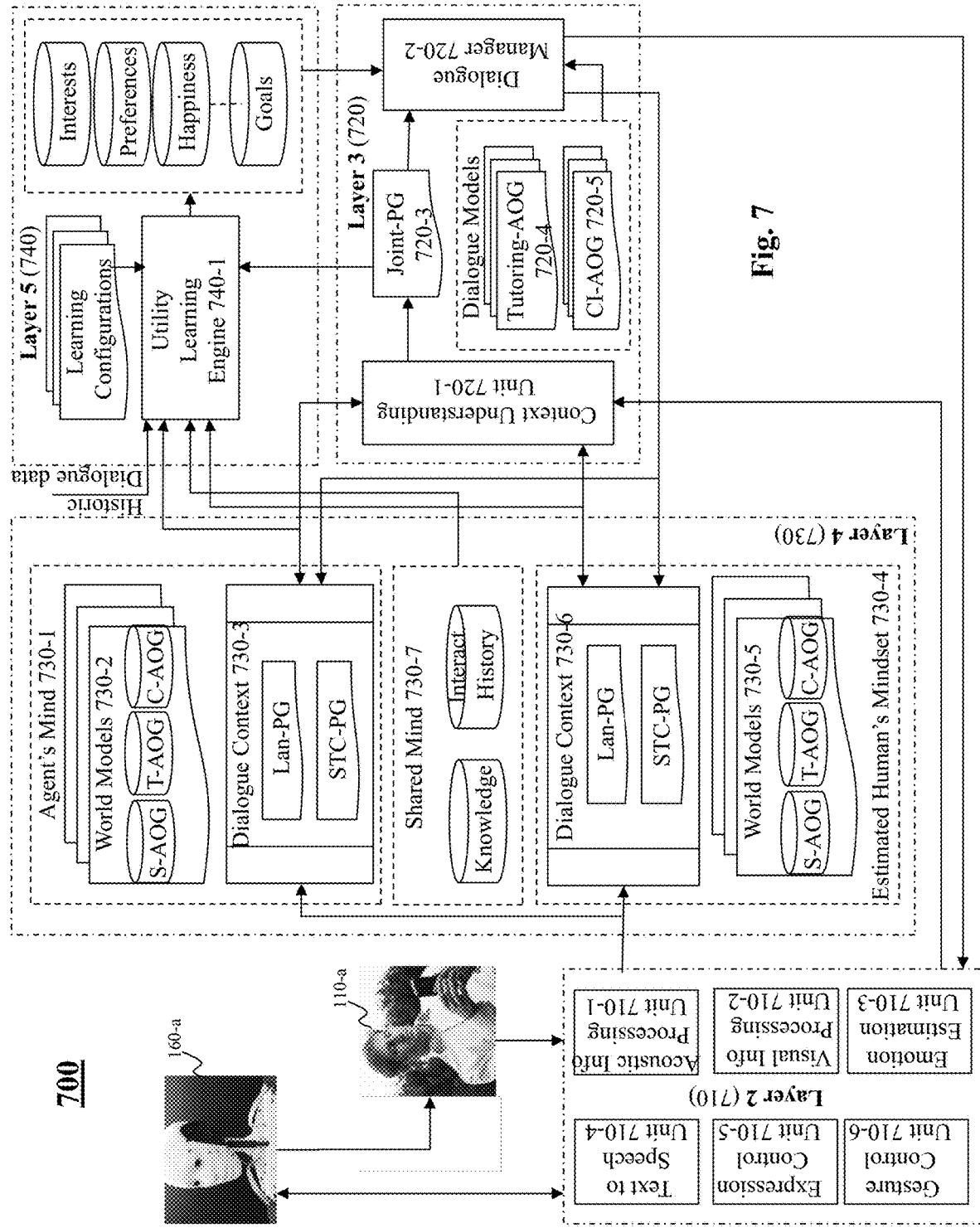
FIG. 7 depicts an exemplary high level system diagram of an automated dialogue companion, according to an embodiment of the present teaching.

FIG. 7 depicts an exemplary high-level system diagram of the automated dialogue companion, according to an embodiment of the present teaching. As disclosed herein, the automated dialogue companion may include both an agent device, e.g., 160-a, and the user interaction engine 140 with processing at different conceptual levels, as illustrated in FIG. 4A and FIG. 5. The system architecture and diagram shown in FIG. 7 represents exemplary implementation of an automated dialogue companion with the capabilities of multi-modal processing at different conceptual levels. As shown, the automated dialogue companion 700 comprises an agent device, e.g., 160-a, and a user, e.g., 110-a, who is operating on a device (Layer 1) equipped with, e.g., different sensors. The system 700 also comprises Layer 2 710, Layer 3 720, Layer 4 730, and Layer 5 740. Each of the layers further comprises different processing components, models, and representations, which may be used by other layers to accomplish different tasks of the dialogue.

In this exemplary embodiment, Layer 2 710 may include input understanding processing components such as, e.g., an acoustic information processing unit 710-1, a visual info processing unit 710-2, . . . , and an emotion estimation unit 710-3. The input may be from multiple sensors either deployed on the user device or on the agent device. Such multimodal information is used to understand the surrounding of the dialogue, which may be crucial for dialogue control. For example, the speech processing unit 710-1 may process acoustic input to understand, e.g., the speech uttered by the agent, the tone of the user's speech, or the user or the environmental sound present at the dialogue scene. The visual information processing unit 710-2 may be used to understand, based on e.g., video information, the user's facial expression, the surround of the user in the dialogue scene such as presence of a chair or a toy and such an understanding may be used when the dialogue manager decides how to proceed with the dialogue. The emotion estimation unit 710-3 may be used to estimate the emotion of the user based on, e.g., the tone of the speech of the user, the facial expression of the user, . . . , etc. The emotion of the user is at a higher conceptual level and abstracted from features at the lower level such as tone and expressions and can be used to assess, e.g., whether the user is in an emotional state to carry on the dialogue and whether the automated dialogue companion needs to change the topic of the conversation in order to continue to engage a user.

The Layer 2 710 may also include output generation components for generation of various signals for controlling the agent device to convey a message to the user. Such components include a text to speech unit 710-4, an expression control unit 710-5, . . . , and a gesture control unit 710-6. The text to speech unit 710-4 may be used for converting a text response from a dialogue manager into its corresponding audio wave form, which can then be used to control the agent to speak the response. The expression control unit 710-5 may be invoked for controlling the agent device to express certain emotion while "speaking" the response to the user. For example, signals may be generated to render, e.g., a smiling face, sad face, or a sympathetic face on a display screen on the robot head of the agent to improve engagement of the user. In some situations, the gesture control unit 710-6 may be used to generate the control signals that can be used to implement certain movement of, e.g., the arm of the agent device, to express additional emotions. For instance, to show encouragement to the user, arm of the agent may be controlled to raise high while the agent is saying "Hooray, great job!"

Such operations performed by the different components in Layer 2 710 may then be used to update representations of the dialogue for both the agent and the user. Layer 4 730 may store various information associated with the dialogue histories of the parties and may be used to derive representations of the agent and the user, respectively, which capture the on-going mindset of each party involved in the dialogue. As the goal of the dialogue may involve reaching a stage of meeting of the minds, such representations may be used to drive to reach a common mindset between the agent and the user. Layer 4 730, as illustrated, includes representations related to an agent's mind 730-1, representations related to a user's mind 730-4, and a shared mind 730-3, which combines, e.g., the agent's ongoing mindset and the user's ongoing mindset.

In representing a user's ongoing mindset, different world models 730-5 and a dialogue context 730-6 established from the perspective of the user are used to represent the mindset of the user. The world models 730-5 for a user may be set up based on spatial, temporal, and causal representations. Such representations may be derived based on what is observed in the dialogue and characterizes, e.g., what is observed in the scene (e.g., objects such as desk, chair, computer on the desk, a toy on the floor, etc.) and how they are related (e.g., how objects spatially related). In this exemplary implementation, such representations may be developed using AND-OR graphs or AOG. Spatial representation of objects may be represented by S-AOG. The temporal representation of the objects over time may be represented by T-AOG (e.g., what is done on which object over time). Any causal relationship between temporal actions and spatial representation may be represented by C-AOG, e.g., when an action of moving a chair is performed (the spatial location of the chair is changed).

Figure 8A:
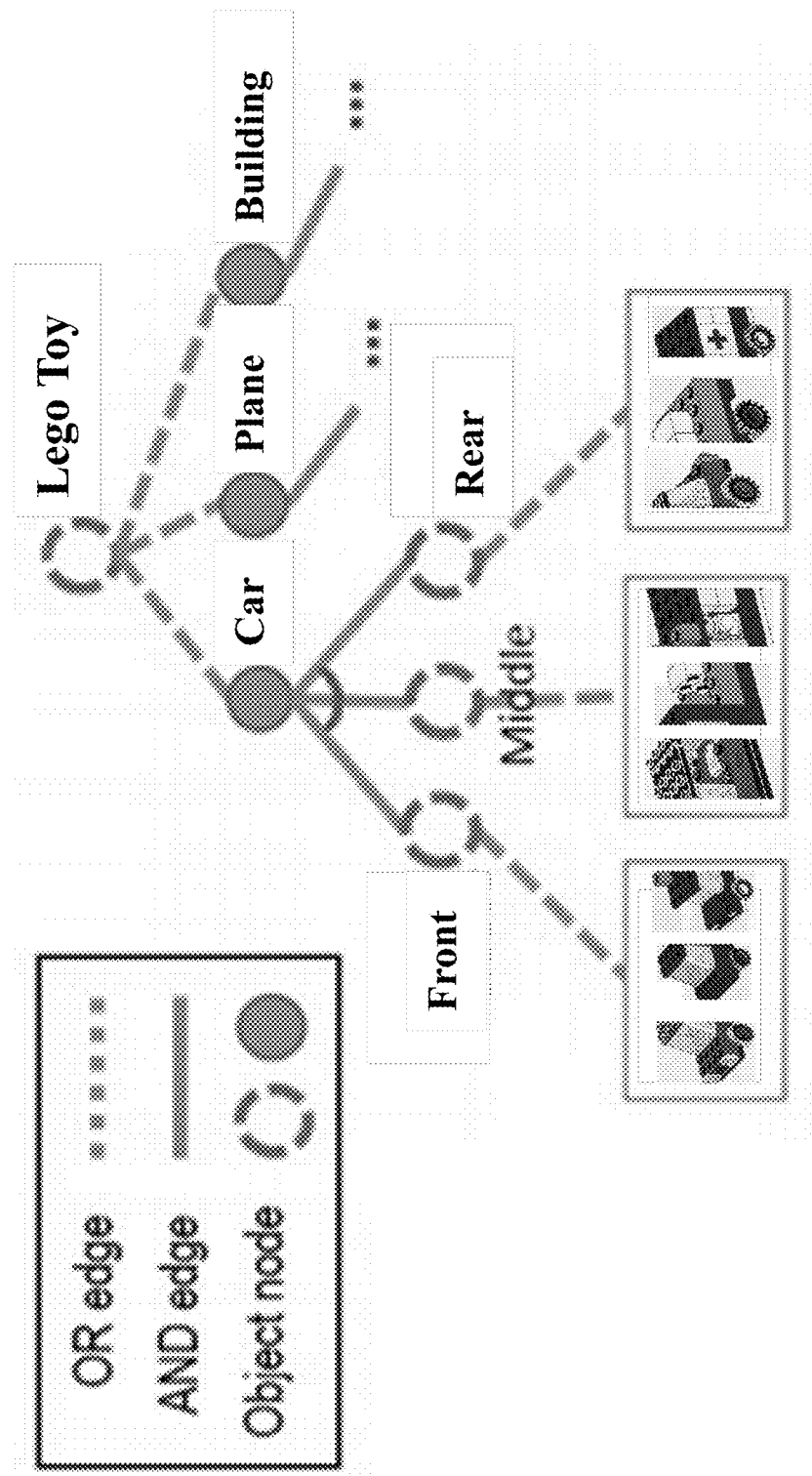
FIGS. 8A-8D provide exemplary spatial, temporal, and causal and/or graphs related to educational dialogues.
Figure 8B:
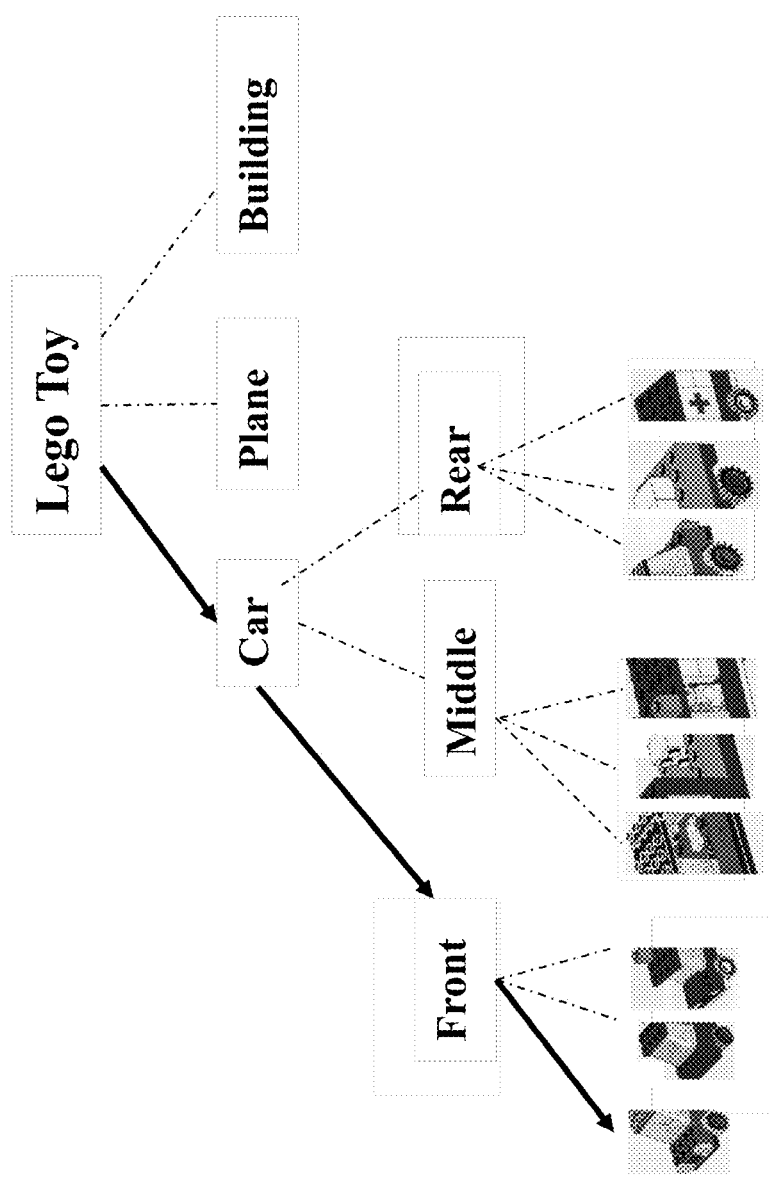
Figure 8C:
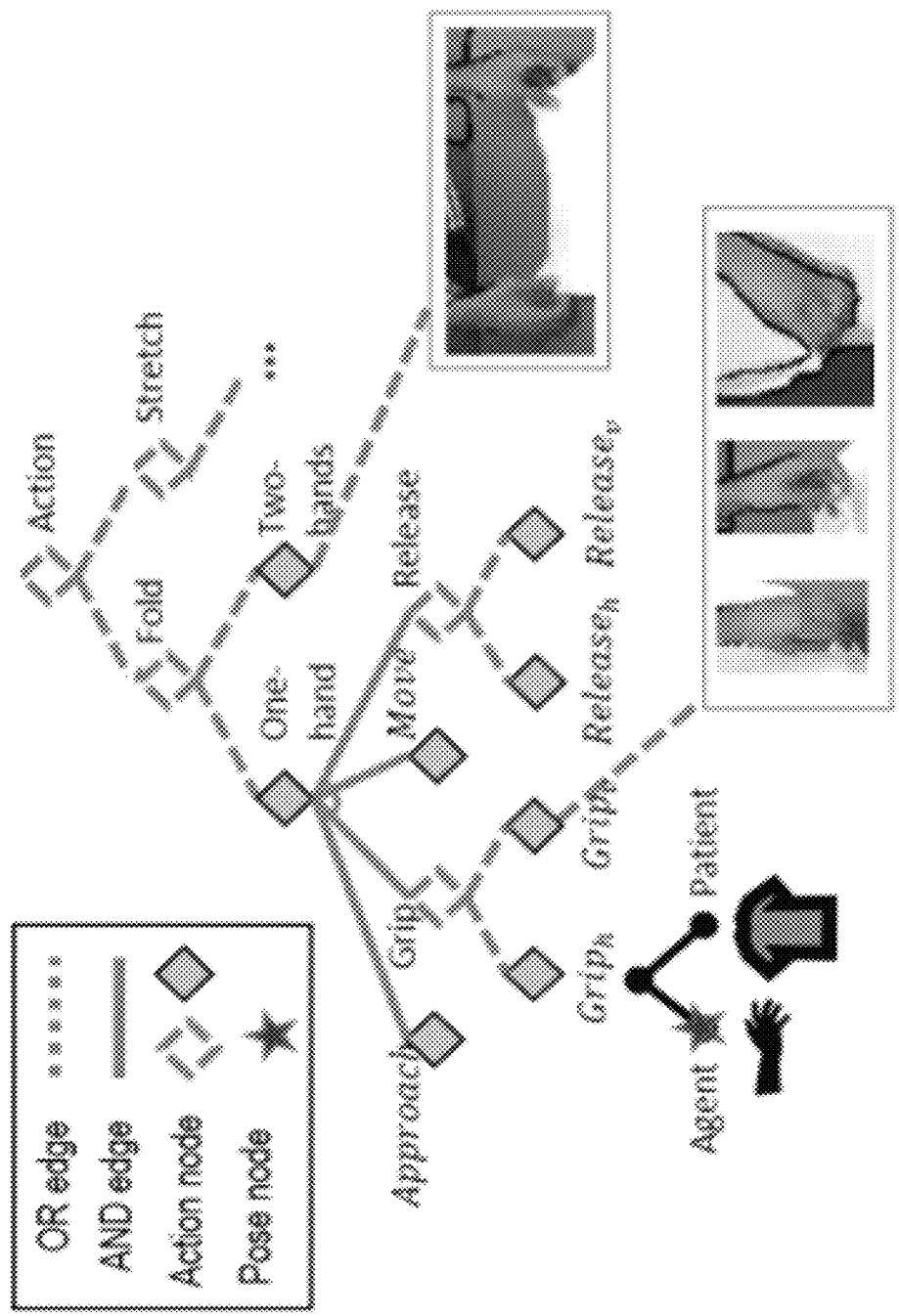

FIGS. 8A-8C provide exemplary spatial, temporal, and causal graphs used for representations related to educational dialogues. FIG. 8A shows a spatial And-Or Graph (AOG) for a Lego toy, where a dotted line represents an OR relationship, a solid line represents an AND relationship, a circle represents an object. A dotted circle means that the items branching out therefrom constitute alternatives or related by an OR relationship. A solid circle means that the items branching out therefrom constitute components of the object represented by the solid circle. For instance, the top dotted circle or node in the AOG in FIG. 8A corresponds to a Lego toy, which can be a Lego car, a Lego plane, or a Lego building. The Lego car node is a solid circle indicating that it has several components, such the front of the Lego car, the middle portion of the Lego car, and the rear part of the Lego car. All these components are necessary (AND relationship) for the Lego car and the spatial AOG as illustrated represents the spatial relationships of different parts. Each of the components may be either decomposed into additional components, which may be related by either an AND or an OR relationship. In FIG. 8A, the front, middle, and rear are illustrated that each has alternative looks (OR relationship) and that is why the circle or node of front, middle, and rear are all dotted.

The spatial AOG or S-AOG as shown in FIG. 8A may be a pre-determined tree capturing the spatial relationships of all objects and components thereof related to a Lego toy. Such a tree may be relied upon on during a conversation and traversed based on the content of the dialogue. For example, in a particular dialogue, if the topic is about a Lego car and the agent is teaching the user how to put different pieces together to create a car, the automated dialogue companion first invokes the S-AOG for a Lego toy, as shown in FIG. 8A, and then traverses to the node representing the Lego car. Depending on the conversation, the automated dialogue companion may traverse the tree based on the content of the conversation. For example, if the user wants to first build the front of the car, the automated companion may traverse from the "car" node to the "front" node, etc. The traversed path in a graph corresponds to a parsed graph or spatial PG or S-PG. This is illustrated in FIG. 8B, where the unexplored paths are represented by dotted lines and the paths that are currently being traversed are represented by solid lines.

FIG. 8C illustrates an exemplary temporal AOG related to actions that can be performed on a piece of cloth. As shown, a diamond shaped node represents an action to be performed on the cloth. Similar to what is discussed with respect to spatial AOG, in the exemplary temporal AOG or T-AOG shown in FIG. 8C, a dotted node indicates that all items branching therefrom are alternatives or connected by an OR relationship. A solid node indicates that all items branching therefrom are components connected by an AND relationship. In this example, it is shown that an action that can be performed on a cloth can be either "fold" or "stretch," wherein the action "fold" can be performed by either one hand or two hands. As illustrated, when one hand is used to fold cloth, this action (solid diamond node) has several necessary steps, including "approach," "grip," "move," and "release." These steps are all connected via "AND" relationship. Each of these steps may again have additional sub-steps which may be connected by either "AND" or "OR" relationships. Depending on how the event develops during a dialogue, the exemplary T-AOG shown in FIG. 8C may be traversed based on a sequence of actions as observed during the dialogue. For instance, a user may decide to use one hand to fold cloth and first grip the left sleeve of the cloth and fold it and then grip the right sleeve of the cloth and fold it. Based on this sequence of events, certain paths of the T-AOG may be traversed and form a parsed graph along with solid lines, each of which corresponds to an action observed. Such a parsed graph (PG) built based on temporal actions is a T-PG.

Figure 8D:
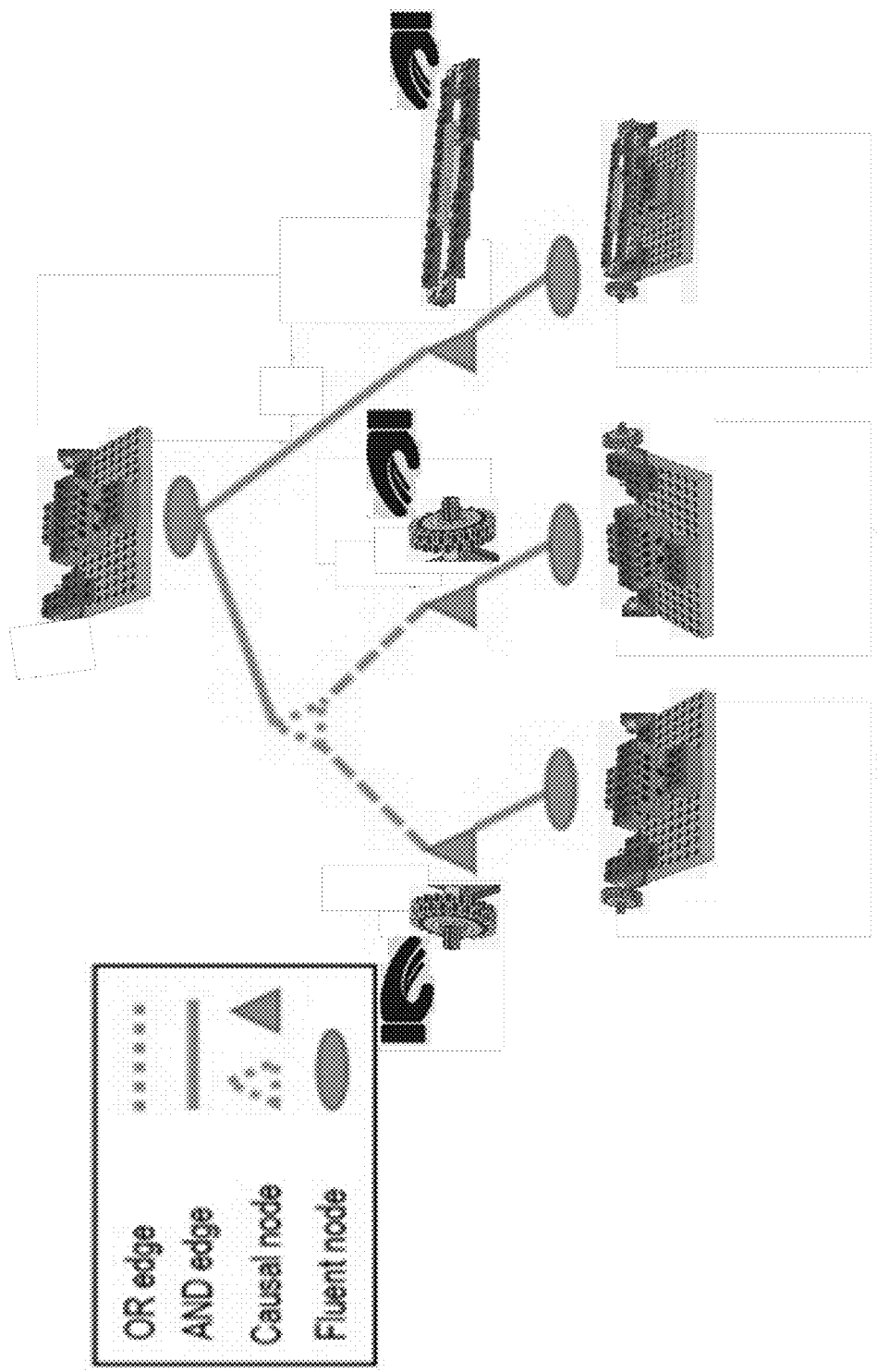

When a certain action is performed on a spatial object, it likely causes the state of the spatial object to change. The transition from an action to a state change constitutes a causal relationship. Such a causal relationship may also be represented based on AND-OR graph or AOG. FIG. 8D illustrates an exemplary causal relationship graph or C-AOG. This example corresponds to a causal relationship graph related to a process of constructing a Lego vehicle structure. As shown, an ellipse corresponds to a connection node with branches corresponding to actions to be taken. A triangle node represents a causal node associated with some action that can causes a state change in an object. A solid node indicates that its branches are connected by an AND relationship and a dotted node indicates that its branches represent alternatives connected via an OR relationship.

In this example shown in FIG. 8D, the top node is a solid ellipse or a connection node, representing a half constructed Lego piece. As this node is a solid node, its branches are connected with an AND relationship. The first branch node on the left is a dotted causal node with two choices related via an OR relationship. The first action choice is to install a wheel on the left side of the Lego piece and the second action choice is to install a wheel on the right side of the Lego piece. The causal effect of each action is shown, e.g., after the first choice action, a wheel appears on the left side of the Lego piece and after the second choice action, a wheel appears on the right side of the Lego piece. The solid ellipse node at the top also has another branch, corresponding to a solid causal node representing an action of placing a top piece on the Lego piece. As illustrated, a user may perform both the causal actions of placing two wheels on the left and right sides of the Lego piece, the next action of place a top piece will cause the Lego piece to transition its state to what is shown at the lower right corner of the causal AOG or C-AOG in FIG. 8D. Compared with the Lego piece on the top of the C-AOG, the resultant updated Lego piece at the lower right corner has two wheels and one tope piece added.

Referring back to FIG. 7, both representations for the agent's mind and for the user's mind utilize S-AOG, T-AOG, and C-AOG (in 730-2 and 730-5, respectively) capture their respective worlds during a dialogue. As indicated herein, when the dialogue causes each party to traverse their respective S-AOG, T-AOG, and C-AOG along certain specific paths, such paths correspond to sub-portions of the their underlying AOGs. Such sub-portions form parsed graphs or PGs. For example, based on the traversed paths of S-AOG, a corresponding S-PG can be derived. T-PG and C-PG can be similarly derived. The S-PG, T-PG, and C-PG with respect to each party may be combined to form a so called STC-PG which represents a dialogue context (730-3 and 730-6, respectively from the agent and user's perspectives).

The STC-PGs represent the dynamics of the dialogue context. In addition to STG-PG representation, the dialogue context may also include the dynamic representation of the conversation content (in language). As known, a dialogue between a human and a machine is often driven by a dialogue tree, traditionally constructed based on a dialogue pattern. For example, a dialogue tree may be developed for teaching a child on geometry in math and the dialogue embedded in such a dialogue tree may be devised based on, e.g., a typical conversation flow in teaching the subject matter. According to the present teaching, when a dialogue tree is related to a specific subject matter, e.g., a tutoring program, a dialogue tree devoted to each of the topics covered by the tutoring program may be developed and used to drive the dialogue with a human user. Such dialogue trees may be stored in the dialogue manager at Layer 3 and may be traversed during the dialogue. The traversed path(s) based on a dialogue tree may form a language parsed tree or Lan-PG and serves as a part of the dialogue context. Each of the user and the agent may have their own Lan-PG, which are developed based on their conversation with each other and saved in their respective dialogue context in 730-3 (for agent) and 730-6 (for user).

The dialogue contexts of both a user and an agent may be dynamically updated during the course of a dialogue. For example, as shown in FIG. 7, whenever a response (e.g., either verbal, expressive, or physical) is delivered to a user via components in Layer 2, the dialogue contexts in Layer 4 may be accordingly updated. In some embodiments, the dialogue manager at Layer 3 (shown as 720-2 in FIG. 7) may also update the dialogue contexts when a response is determined. In this way, the dialogue contexts are continuously updated during the dialogue and then utilized to adaptively determine the dialogue strategy.

Such dialogue contexts, representing the perspective of each party, may be combined to generate shared mind 730-7, as shown in FIG. 7, which represent the dynamic context and histories of the dialogue involving two parties, corresponding to some form of shared mind of the user and the agent.

For example, from such collective dialogue histories, user preferences may be learned and relevant knowledge may be established as to what is effective to whom under what circumstances. According to the present teaching, such information related to the shared mind may be utilized by a utility learning engine 740-1 at Layer 5 740 to learn utilities or preferences of either individual users or preferences of some collective groups of users with respect to different subject matters. The utility learning engine 740-1 may also learn the preferences of agents on communicating with certain types of users on different subject matters to understand what dialogue strategies works for which user in what subject matters.

In some embodiments, historic dialogue data from past dialogues may be used to learn utilities, as shown in FIG. 7. Such training data may record when users perform well in dialogues and corresponding parsed graphs that lead to the good results such as the contexts of such dialogues, events occurred during the dialogues that lead up to the satisfactory outcomes. Such dialogue contexts associated with good performances may reveal "utilities" for future dialogues and correspond to preferred dialogue strategies which may be learned and used to guide future dialogue management. In this way, the utility learning engine 740-1 may learn, from past dialogues, what worked for whom in what manner and under what situations. In addition, the utility learning may also rely on the estimated shared mindset, the individual mindsets of the user and the agent, as shown in FIG. 7. In some embodiments, a joint-PG derived at Layer 3 (discussed below) for dialogue management may also be accessed by the utility learning engine 740-1 for learning of utilities implicated in such data.

Information from different sources may be provided to the utility learning engine 740-1 to capture effective or workable dialogue strategies with respect to different users, in different dialogues, and under different circumstances. As discussed herein, the historic dialogue data, the shared minds, the individual mindsets estimated during dialogues 730-3 and 730-6, and optionally joint-PG may be exploited by the utility learning engine 740-1 to learn utilities with respect to individual users, groups of users, different dialogues of varying topics, different goals, and different dialogue strategies in different contexts. Such learned utilities may be stored at Layer 5 (e.g., according to interests, preferences, goals, etc.) and can be accessed by the dialogue manager 720-2 to adaptively drive the dialogues based on learned utilities. As shown in FIG. 7, the dialogue manager 720-2 manages a dialogue based on information from different sources, including the utilities learned by the utility learning engine 740-1 and stored in different databases, the dialogue models associated with an intended topic associated with an on-going dialogue, and the current state or dialogue contextual information of the on-going dialogue (e.g., a joint-PG), etc.

To rely on dialogue contextual information of an on-going dialogue to determine how to proceed with the on-going dialogue, the dialogue contexts from both the agent's mind (730-3) and the user's mind (730-6) are used by a content understanding unit 720-1 at Layer 3 to derive a combined dialogue context represented as joint-PG 720-3. The context understanding unit 720-1 may also receive information from Layer 2 derived by different processing units therein based on multimodal sensor data from the user's device or the agent device. For example, information from Layer 2 may provide information indicative of factors (e.g., the user's emotion) that may be considered in determining the next response to user in the on-going dialogue. The parsed graphs from the agent and the user (Lan-PGs and STC-PGs) as well as information from Layer 2 may be analyzed by the contextual understanding unit 720-1 to generate a joint-PG 720-3 to represent the contextual information of the current state of the dialogue, which may then be used by the dialogue manager 720-1 to determine the next response. In some embodiments, the joint-PG 720-3 may also be used by the utility learning engine 740-1 for learning the utilities.

In addition to the current dialogue context, the dialogue models also rely on dialogue trees related to different subject matters such as education or health. In FIG. 7, exemplary dialogue trees related to tutoring in education on different topics are illustrated. It is understood that such exemplary examples do not serve as limitations and dialogue models directed to any other subject matters are within the scope of the present teaching. As illustrated in FIG. 7, dialogue trees related to tutoring may be represented as tutoring-AOGs 720-4. Each of such AOG may correspond to a specific tutoring task directed to a certain topic and can be used by the dialogue manager 720-2 to drive a dialogue with a user on the topic.

According to the present teaching, in addition to dialogue trees that are orientated for certain intended tasks, the dialogue models may also include non-task oriented dialogue trees, e.g., communicative intent type of dialogues represented in FIG. 7 as CI-AOGs 720-5. In some embodiments, in conducting a dialogue with a user, the dialogue manager 720-2 at Layer 3 (720) relies on dialogue tree(s) associated with one or more topics intended by the dialogue and drives the conversation with a user based on the user's previous response(s). Traditional systems follow a pre-design dialogue tree and have little flexibility, which often causes frustration to a human user and leads to bad digital experiences. For instance, in certain situations in human machine dialogue, the conversation may be stuck for a variety of reasons. The user may not get the correct answer for several rounds in an educational dialogue and becomes upset. In this situation, if a machine agent continues to press on the same topic by following the pre-set dialogue tree, it will likely further disengage the user. According to the present teaching, different types of dialogue trees, e.g., task oriented dialogue trees and non-task oriented trees, may be adaptively explored in the same dialogue in order to keep the user engaged in different situations. For example, temporarily changing the subject that already frustrated a user by talking about something else, particularly on something that the user is known to be interested in, may enable the agent to continue to engage the user and may also lead to the user to eventually re-focus on the initial topic intended. The communicative intent dialogue trees (represented as CI-AOGs) provide alternative non-tasks oriented dialogues that can be invoked during a dialogue based on situation.

Figure 9A:
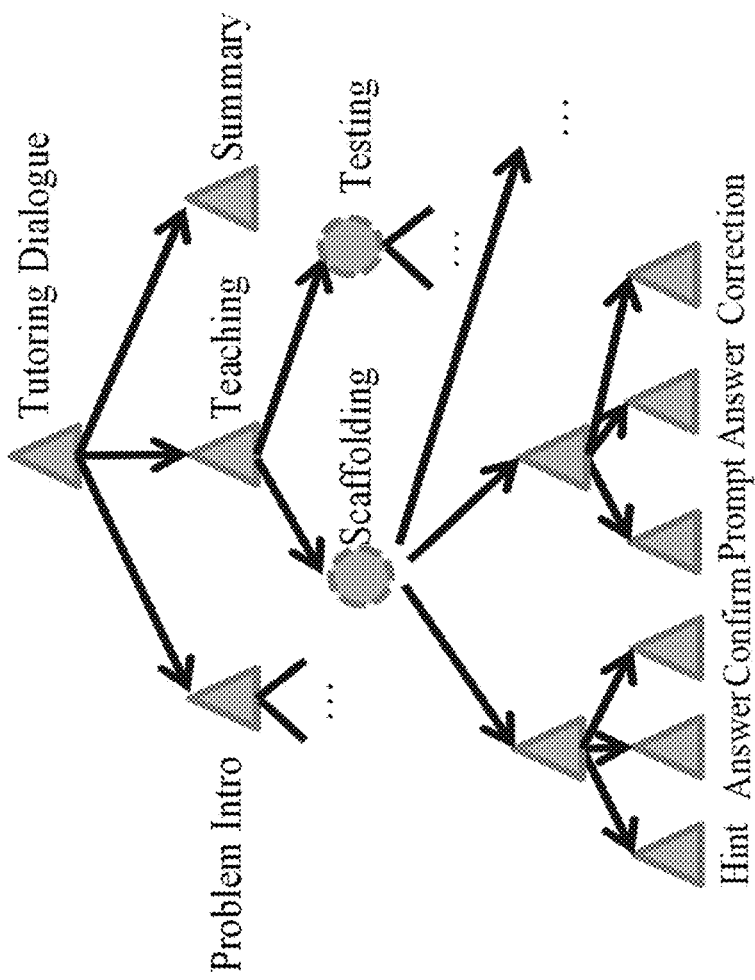
FIG. 9A provides an exemplary and/or graph related to a tutoring program.
Figure 9B:
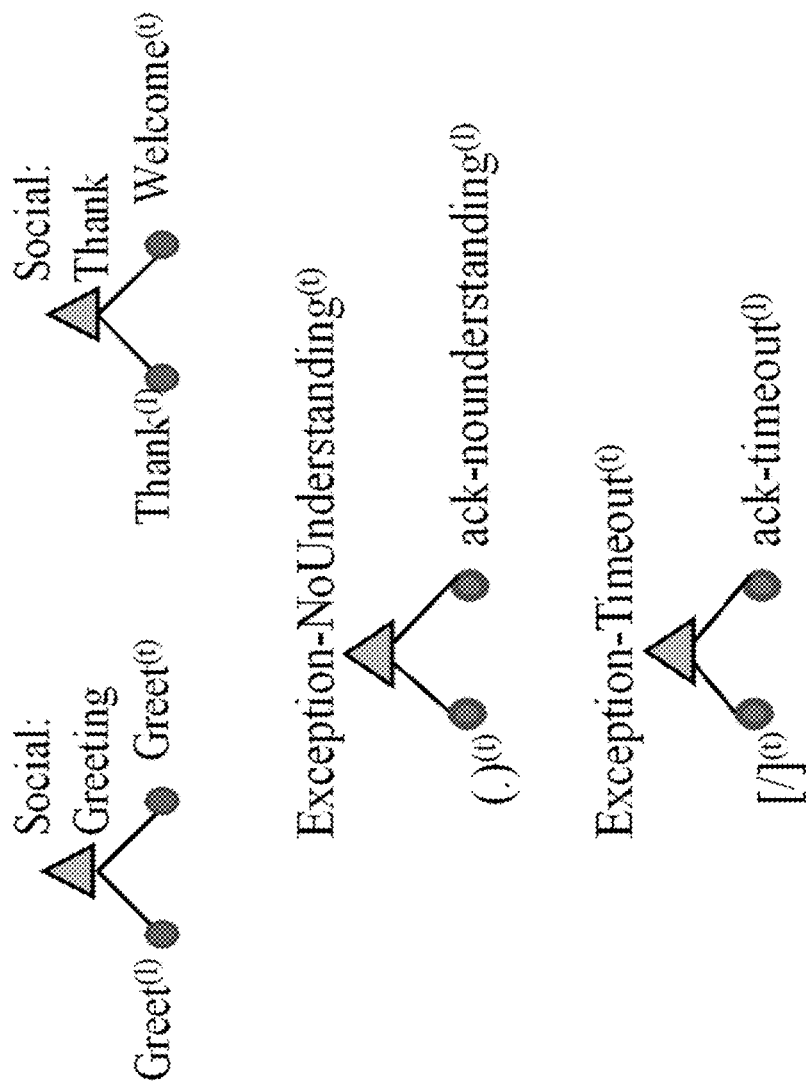
FIG. 9B provides an exemplary and/or graph related to so called communication interaction dialogue.

FIGS. 9A-9B provide examples of tutoring-AOG and CI-AOGs. FIG. 9A illustrates an exemplary generic tutoring dialogue tree represented as a tutoring-AOG. As discussed herein, a solid node represents that branches therefrom are related by an AND relationship. As shown, in this generic tutoring dialogue tree, a tutoring dialogue includes a dialogue on problem introduction, a dialogue related to teaching itself, and a dialogue related to a summary of what is learned. Each of the dialogues herein may include additional sub-dialogues. For example, for the dialogue for teaching, it may include a sub-dialogue related scaffolding and an additional sub-dialogue for testing, where "scaffolding" refers to a process in education in which teachers model it demonstrates how to solve a problem to students and step back and offer support as needed. In this example, the scaffolding sub-dialogue may further include two different sub-dialogues, one for hinting a user at an answer and one for prompting a user to provide an answer. The sub-dialogue for hinting an answer includes the dialogues for providing a hint to a user, for the user to provide an answer, and for confirming the user's answer. While the sub-dialogue for prompting a user to answer may further include the dialogues for prompting a user to provide an answer, for the user to provide an answer, and for making a correction to the user's answer. Other branches may also have various levels of sub dialogues in order to fulfill the goal of tutoring.

According to the present teaching, the communicative intent conversations may be conducted based on non-task oriented dialogue trees based on some relevant CI-AOGs. There may be different types of CI-AOGs corresponding to different scenarios. FIG. 9B illustrates different exemplary CI-AOGs. For example, there is a CI-AOG for social greetings, which may branch out to different greetings, e.g., greeting (1), . . . , to greeting (t), for social thanking AOG, similarly branching out to different forms of thanking, e.g., thank (1), . . . , welcome(t), etc. These AOGs may be used in conjunction with a dialogue intended for the dialogue to, e.g., enhance the user experience (e.g., by greeting the user first or even have a small talk first to relax the user) or to, e.g., encourage the user's participation, e.g., when the user is doing well, the agent may thank the user to encourage continued engagement.

There may also be different CI-AOGs for situations when exception handling is needed. FIG. 9B illustrates two exemplary exception handling AOGs, one for a No-understanding exception, i.e., a situation that a user's answer is not understood by the agent, and a timeout exception handling, e.g., a situation where a user did not answer a question within a given period of time. An appropriate exception handling AOGs may be invoked when a corresponding exception is detected. For example, when it is detected that a user does not respond to a question from the agent or does not converse with the agent in a period of time, the timeout AOG may be used to inject into the on-going dialogue tree and the agent may ask "Do you need more time?" to serve as a gentle reminder. If the situation persists, the timeout-AOG may be further traversed according to the situation and guide the agent to ask, "Are you still there?" or "Can I help you with that?" Such injected conversation, although deviating from the original conversation related to an intended topic, may help to re-engage the user when the initial dialogue is fading out.

In some embodiments, conversations with a communicative intent (CI) may be developed adaptively based on what is observed from the dialogue scene. As one example, in greeting a user (by invoking a social greeting CI-AOG), based on what is observed of the user or the dialogue scene, the greeting may be adaptively determined based on, e.g., the joint-PG constructed by the context understanding unit 720-1 based on what is going on with the dialogue. For instance, if a user is observed wearing a yellow shirt (understood by the context understanding unit 720-1 based on detected information from Layer 2 based on multimodal sensor data as shown in FIG. 7), the greeting from the agent may leverage that observation and devise a greeting such as "Good morning! Your shirt looks as bright as the sunshine."

Figure 10:
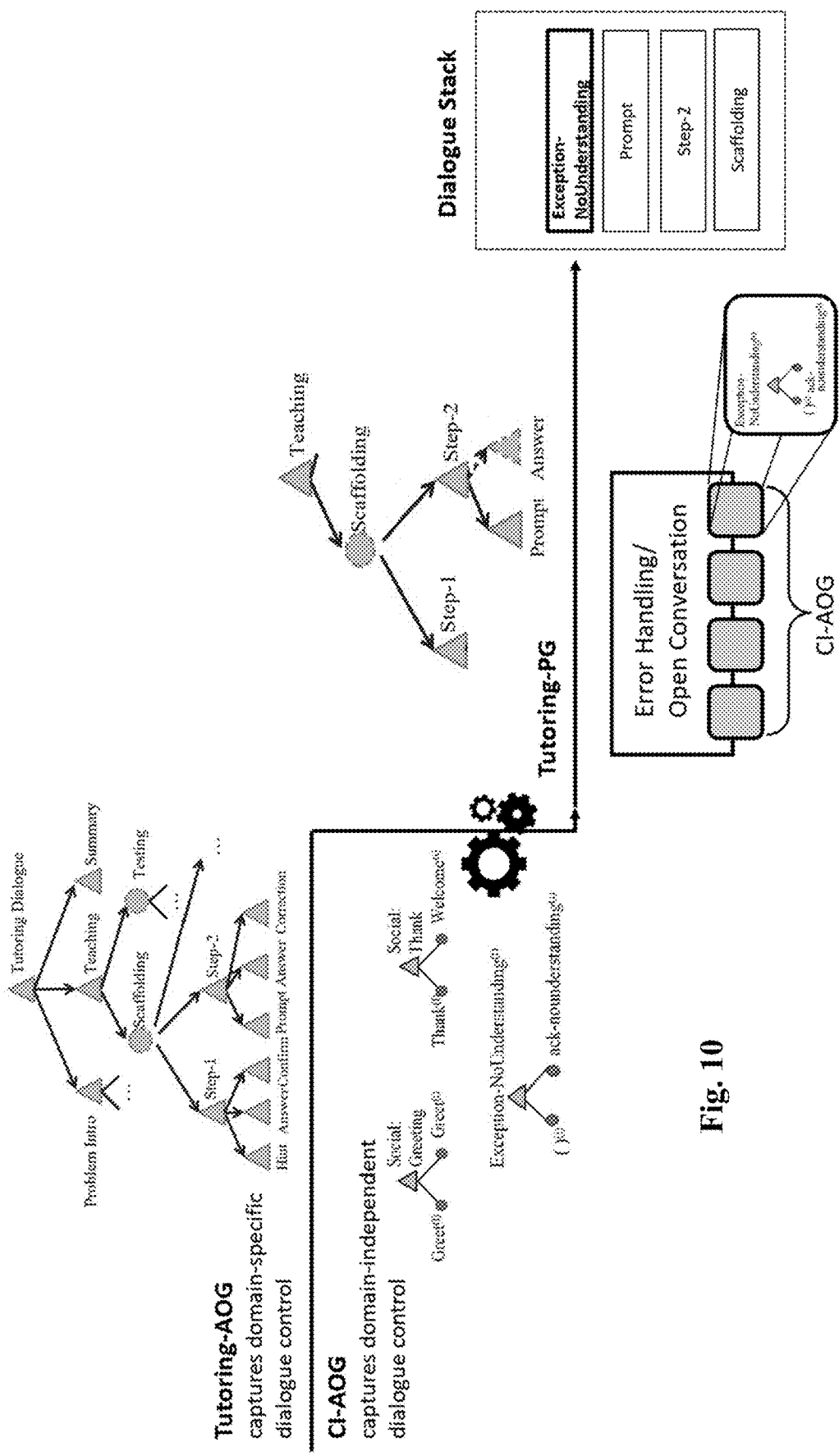
FIG. 10 is a flowchart of an exemplary process of an automated dialogue companion, according to an embodiment of the present teaching.

A change in dialogue topics requires a switching from one dialogue tree to the other and the switching is determined based on what is observed. FIG. 10 provides an exemplary situation where a dialogue is switched from a task oriented dialogue tree to a non-task oriented dialogue tree, according to an embodiment of the present teaching. As seen in FIG. 10, a dialogue session with a user on a tutoring program (task or domain specific dialogue) can be conducted based on both a tutoring-AOG (that is used for domain specific or task oriented dialogue control) and some CI-AOG(s) (used for domain independent or non-tasks oriented dialogue control). In this example, the domain specific dialogue tree employed is a tutoring program so that a tutoring-AOG is used to drive the task oriented conversation. The dialogue manager 720-2 may also utilize CI-AOGs to inject non-task oriented conversations with the user whenever appropriate. In FIG. 10, it is shown that the dialogue manager 720-2 may decide to start with a friendly greeting (non-task or domain independent conversation) before jumping into the domain specific topics. For instance, it may rely on the social greeting CI-AOG to utter some greeting to the user. In some embodiments, the choice of greeting utterance may also be adaptively determined based on, e.g., the state of the user, the surrounding of the dialogue scene, etc. represented by the joint-PG based on information from Layer 2.

During the dialogue session, the dialogue manager 720-2 may also use other CI-AOGs, e.g., the social thank-AOG or the exception handling AOGs when the situation in the dialogue calls for. If a user responds with a correct answer, an CI-AOG for encouragement (not shown in Figures) may be invoked and an appropriate utterance for praising the user may be used, e.g., "Wonderful!" to inject the domain independent conversation. In the example illustrated in FIG. 10, at the second step of the teaching-AOG, after the agent prompts a user, the automated dialogue companion receives an answer which is not understood because it is not what is scripted in the domain specific dialogue tree. In this case, as shown in FIG. 10, an error handling or exception handling situation occurs and the current conversation is open to an injected conversation. In this case, the dialogue manager 720-2 invokes an exception handling AOG directed to "No Understanding" and uses that AOG to drive the conversation for the next response to the user. In this case, in the dialogue stack recording the history of the on-going dialogue, the dialogue manager 720-2 pushes the next step onto the stack as relating to the exception handling directed to "No Understanding." A specific response under the No Understanding exception handling may be derived further based on, e.g., the current dialogue context represented by the joint-PG 720-3 and the utilities/preferences learned at Layer 5.

In determining a response, the dialogue manager 720-2 may use information from different sources and determine a next action (response) by maximizing some gain, which is determined based on expected utilities learned by the utility learning engine 740-1. In some embodiments, an action or a response may be determined by optimizing a function based on the contextual information of the dialogue as well as the known utilities of the user. An exemplary optimization scheme is presented below:

$$a^* = \mathrm{argmax} EU(a \mid s_t, pg_{1...t})$$

$$EU(a \mid s_t, pg_{1...t}) = \sum_{s_{t+1}} P(s_{t+1} \mid s_t, pg_{1...t}, a)(R(s_{t+1}) + \gamma \cdot \mathrm{max} EU(a \mid s_{t+1}, pg_{1...t+1}))$$

In this optimization scheme, what is optimized is an action denoted by "a", corresponding to an action to be taken at time t+1 of the dialogue, including a response or an utterance to the user. As seen from this exemplary formulation, the optimized action is denoted as "a*" which is an action "a" at time t+1 optimized by maximizing the expected utility (EU) across all possible actions with respect to the current state $S_t$ at time t and the joint-PG encompassing the dialogue context from time 1 to time t. The expected utility with respect to each action a is denoted as EU (a|$S_t$, $PG_{1, \ldots, t}$), which represents the expected utility of taking an action at information state St given the current state and the dialogue context PG up to time t. In some embodiments, the PG as expressed in the above formulation refers to the joint-PG as depicted in FIG. 7, that captures the overall information of the dialogue state involving the agent and the user (instead of merely the PG related to either the user or the agent).

In the above formulation of EU (a|$S_t$, $PG_{1, \ldots, t}$), $S_{t+1}$ represents a next state that can be reached from current state $S_t$ by executing action a. P ($S_{t+1}$|$S_t$, $PG_{1, \ldots, t}$, a) represents the probability of reaching next state $S_{t+1}$ at time t+1 from current state $S_t$ at time t when executing action a. R($S_{t+1}$) represents a reward realized by traversing a path in the sub-dialogue associated with an action that, upon being executed, produces the next state $S_{t+1}$. Such a reward may be learned from data related to past dialogues and outcomes. For example, if following a certain path in the past has produced satisfactory results in certain situations, a higher reward may be provided if the same path is being explored in the current dialogue. Such a higher reward may also be keyed on a similarity of users involved in such past dialogues and the user in the current dialogue. Such reward values may be learned by the utility learning engine 740-1 based on past dialogue data and the results, as discussed herein, are made accessible (as utilities) to the dialogue manager 720-2.

As can be seen from the above exemplary formulation, the expected utility EU (a|$S_t$, $PG_{1, \ldots, t}$) with respect to an action a, given the current state $S_t$ and the historic dialogue context $PG_{1, \ldots, t}$, it is further formulated in a recursive form, which is seen in Max EU ($a_{t+2}$|$S_{t+1}$, $PG_{1, \ldots, t+1}$), which corresponds to forward optimization. That is, this part looks one step further from the current step to see if a current action a is taken, what is the expected utility to be yielded if an action $a_{t+2}$ is taken at time t+2 given the state $S_{t+1}$ and dialogue context $PG_{1, \ldots, t}$ realized by executing an action at time t+1. In this manner, the optimization of a at time t+1 also takes into account of whether this action a will also lead to a look-ahead maximized expected utility. The span of the look ahead may be specified, e.g., look ahead three steps, i.e., recurse three levels deep. Such experimental parameters may be adjusted based on application needs.

In the formulation above, there may also be parameters. For instance, the current probability and the look-ahead expected utility may be weighed using different weights. In the above exemplary formulation, a gamma co-efficient is used to weigh the look-ahead expected utility. Additional parameters such as alpha co-efficient may be used as a weight to the probability P ($S_{t+1}$|$S_t$, $PG_{1, \ldots, t}$, a). Such weighting parameters to the optimization may also be adaptively adjusted based on, e.g., machine learning such as the utility learning engine 740-1.

The expected utilities as optimized according to the above exemplary formulation may be accumulated over time based on continuous learning. As discussed herein, the utility learning engine 740-1 performs learning based on actual dialogue data and in such learning, the reward may also be learned based on, e.g., the outcome of the past dialogues. For instance, if certain dialogue paths (including actions, states, and PGs) being traversed in past dialogues reached satisfactory outcome, e.g., shorter learning time on the tutored concepts and good test results, actions along certain states along such past paths under certain PGs may be assigned with higher rewards. Similarly, past dialogue paths (which includes actions, states, and joint-PGs) that yielded poor outcome may be assigned to lower rewards.

Figure 11:
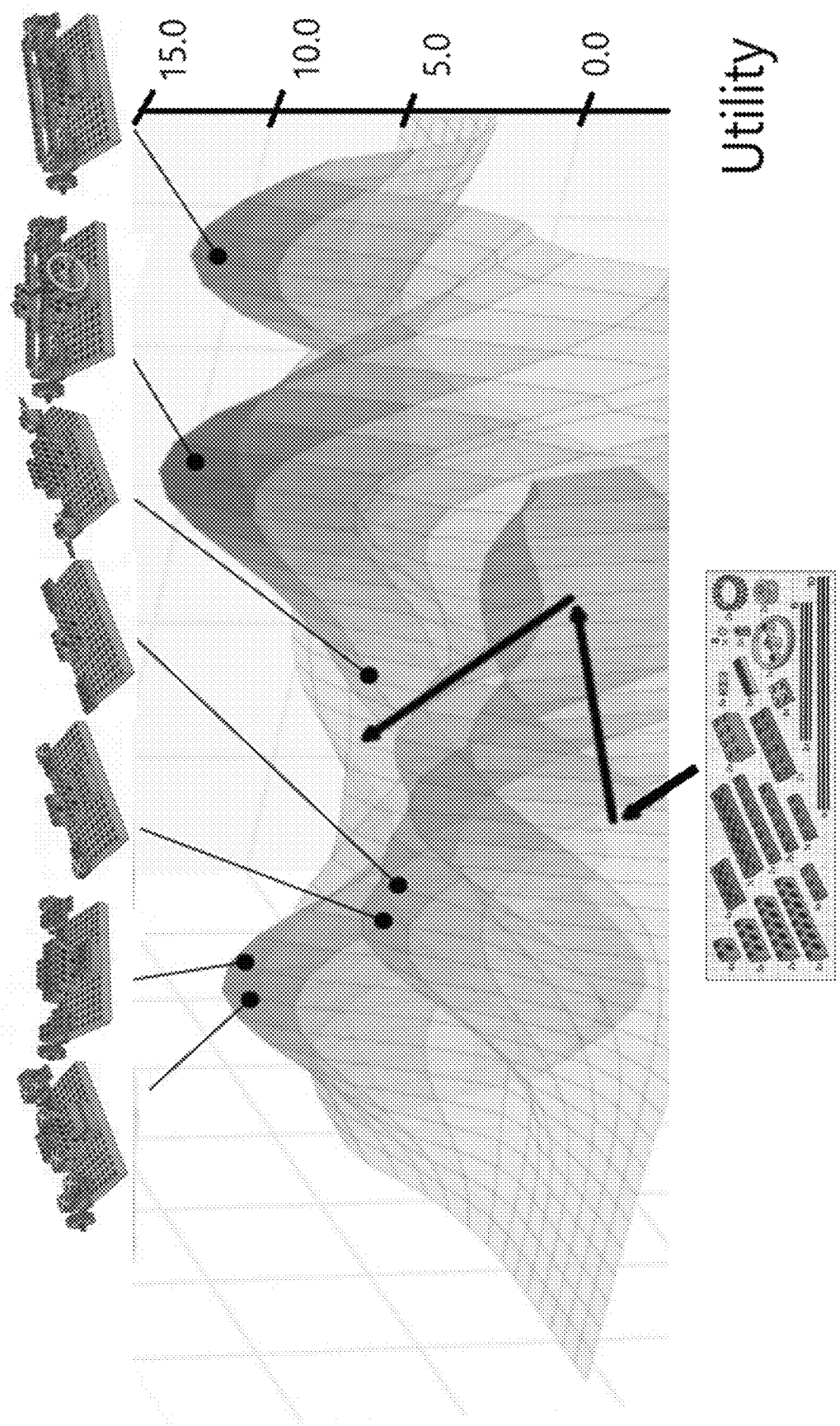
FIG. 11 depicts an exemplary utility function representing preferences related to a Lego educational program, according to an embodiment of the present teaching.

In some embodiments, such learned utilities or preferences (e.g., in the form of reward scores) with respect to past dialogue paths may correspond to discrete points in a feature space, i.e., for each discrete point in the space representing a specific state along a specific path related to a specific dialogue, there is an associated reward score. In some embodiments, such discrete points may be used to interpolate a continuous utility function via fitting a continuous function, which may then be used by the dialogue manager 730-1 to determine how to proceed a dialogue by searching for a point in the space that leads to an uphill climbing towards a maximum point. FIG. 11 depicts an exemplary continuous function representing a distribution of expected utilities projected into a two dimensional space, according to an embodiment of the present teaching.

As can be seen from FIG. 11, projected in the illustrated 2D space is a continuous function corresponding to an expected utility function learned by the utility learning engine 740-1 related to a dialogue topic of teaching a user to assemble a Lego toy. In the original high dimensional space in which this expected utility function is learned, features along different dimensions may correspond to different observations or states of the dialogue. The value of this high dimensional expected utility function at each point in the high dimensional space represents the utility level at that coordinate point, i.e., the utility level (or a degree of preference) given the features values along the dimensions, which may be different dialogue states, contextual parameters, emotional/intent parameters, or actions. When such an expected utility function in the high dimensional space is projected into a 2D space, the relative levels of the utility levels at different points are substantially preserved, although the feature values for each utility level may also become condensed at a more semantic level. As shown, the 2D projection of an expected utility function related to Lego tutoring dialogue have various peak points, valley points, and anything in-between such points. The higher a value on the projected function, the higher the utility level or the degree of preference. Each point on the projected function corresponds to a particular dialogue state and any next action taken in response to the particular dialogue state causes a movement from the original point to a nearby point along the projected function.

As can be seen, for example, at the bottom of the 2D projection of the exemplary expected utility function in FIG. 11, there is a group of unassembled Lego pieces, representing an initial state of the tutoring session and it corresponds to a low utility level (i.e., lower degree of preference). Based on this function, the goal of the tutoring session is to reach the highest peak point, which represents a full assembled Lego toy that has all pieces assembled together (see the second on the right in the top row with partial or fully assembled Lego toy piece). There are other peak points that correspond to partially assembled Lego toy. There are other peak points as well, each corresponding to a sub-optimal result with the Lego toy partially or near fully assembled. For example, the right most peak point corresponds to a not quite fully assembled Lego toy where the only pieces that are not yet assembled are the front wheel and a top piece. The process of climbing, from the starting point corresponding to the initial state of the session to the highest peak point along the contour of the projected continuous function, corresponds to the dialogue process. At each point, the next action (e.g., responding to a user in a dialogue) may be determined by maximizing the probability of reaching the highest peak point or a peak point.

In this learned utility space, when a dialogue session reaches a certain state with a known PG, it may be mapped to a corresponding point in the learned utility space and the next response can then be determined that will enable the dialogue to proceed in a direction towards a peak point along the continuous utility function in the utility space. For example, in order to decide a next action, a maximum derivative of the function may be computed and an action related to the maximum derivative may be taken as the next action, which will maximize the expected utility according to the continuous utility function. In this manner, the learned utility, although discrete, may be used to form a continuous utility function to enable the dialogue manager to adaptively determine how to proceed with the dialogue. When more dialogue data is collected and used to train to learn the expected utility, the better the learned utility function and adaptive dialogue performance.

The learning of the expected utilities as depicted in FIG. 11 may also incorporate the look-ahead capabilities. With the past dialogue data collected, as such look-ahead is made available, such knowledge may be learned and embedded in the learned expected utilities. In addition, as discussed herein, the utility learning engine 740-1 learns the expected utilities based on information that embeds not only the shared minds from Layer 4 (which includes the knowledge and interaction histories from the past and on-going dialogues, which are derived from the dialogue contexts from both agent's mind and the users' minds, i.e., STC-PGs and Lan-PGs) but also the joint-PG 720-3 (which also embeds directly STC-PGs and Lan-PGs, as well as the multimodal data analysis result from Layer 2), the learned expected utilities are the outcome of multiple facet considerations and constitute rich models for enabling adaptive dialogues.

Figure 12:
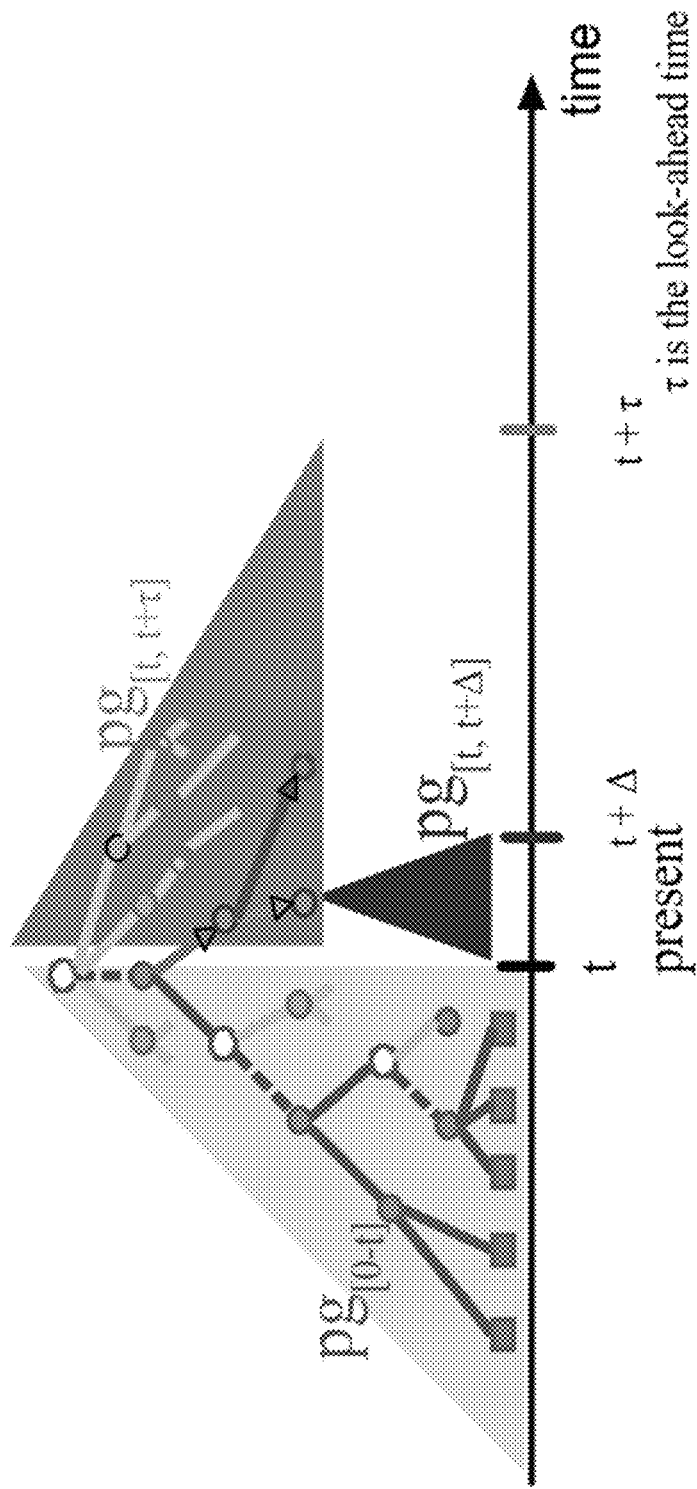
FIG. 12 illustrates an exemplary mode of deciding a response of an agent based on past history and forward looking optimization, according to an embodiment of the present teaching.

As discussed herein, the utilities learned from the dialogue data may further include look-ahead capability which may better maximize the expected utility at each state and avoid local minimums in the utility function space. With the learned expected utilities with look-ahead built in, at each step, it further facilitates the dialogue manager 720-2 to achieve enhanced adaptivity and performance. FIG. 12 illustrates how the learned utilities enable improved decision making in adaptive dialogue strategies, according to an embodiment of the present invention. As shown, at time t (or within a small window t+Δ), which represents the resolution at which a dialogue decision is made), a dialogue related decision is made based on both the past PG as occurred in time period [0, . . . , t] and the future PG in time period [t, . . . , t+τ], wherein the PG in the future time period [t, . . . , t+τ] corresponds to the look ahead period. As shown in this example, the look ahead time frame includes multiple possible steps from the current time t. In this case, the optimized dialogue decision is made based on a maximized expected utility value across all possible actions, including past actions embedded in the current state and current PG (encompassing all prior states and actions) and all future possible actions within a specified look-ahead time frame.

Figure 13:
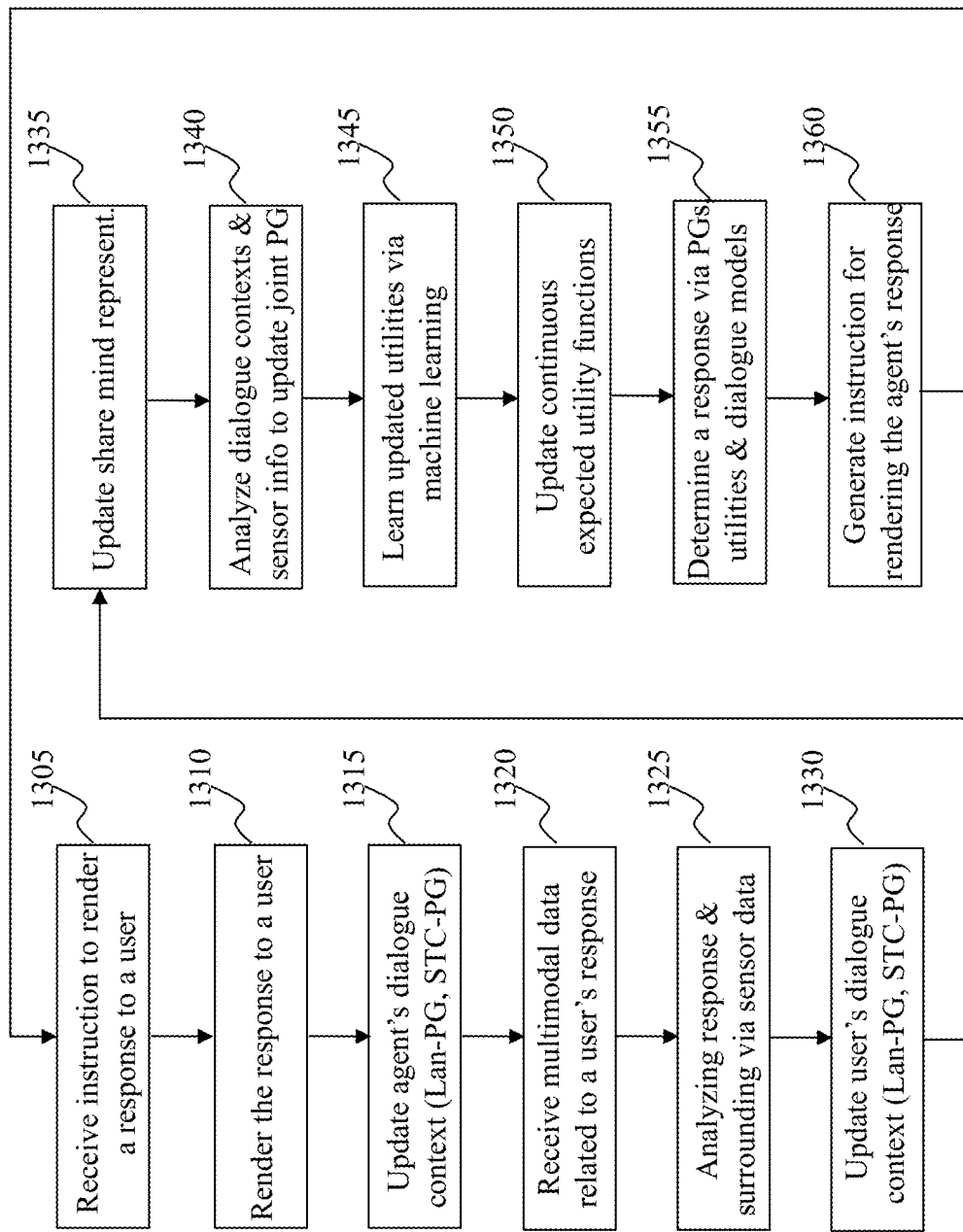
FIG. 13 illustrates the concept of model switching during a dialogue, according to an embodiment of the present teaching.

FIG. 13 is a flowchart of an exemplary process of the automated dialogue companion 700, according to an embodiment of the present teaching. As a dialogue process involves back and forth steps between a user and the automated dialogue companion, the process as shown in FIG. 13 is presented as a loop in which an agent device first receives, at 1305, instructions from the user interaction engine 140 (i.e., the backend system of the agent device) to render a response to a user. The response can correspond to an initial communication from the agent to the user when the user just appears or can be a communication in response to a previous utterance from the user. The instructions for rendering a response may be directed to a verbal response, i.e., an utterance of a verbal expression to the user, a visual expression presented while uttering the verbal response, e.g., with a facial expression such as a smiley face, and/or instruction related to implementing a physical act, e.g., raising the left arm while uttering the verbal response to express excitement. Based on the instructions, the agent device renders, at 1310, the response to the user. Based on the rendered response from the agent to the user, the agent's dialogue context 730-3 (Lan-PG, STC-PG) at Layer 4 is updated at 1315.

After the user receives the agent's response, the user may further respond to the agent's communication and such a further response from the user may be captured via multimodal sensors located on either the user's device or on the agent's device. Such multimodal sensor data related to the user's response are received at 1320 by the processing units in Layer 2. As discussed herein, the multimodal sensor data may include acoustic signals capturing the speech of the user and/or the environmental sound in the dialogue environment. The multimodal sensor data may also include visual data capturing, e.g., the facial expression of the user, the physical act of the user, the objects in the surrounding dialogue environment, etc. In some embodiments, the multimodal sensor data may also include haptic sensor data capturing information related to the user's movements.

The received multimodal sensor data are then analyzed, by various components at Layer 2 (e.g., 710-1, 710-2, . . . , 710-3) at 1325, to determine, e.g., what was said by the user, the tone in which the user utter the response, facial expression of the user, gesture of the user, what is in the dialogue environment, what was changed in the environment due to user's actions, the sound of the environment, the emotion/intent of the user, etc. The analyzed results are then used to update, at 1330, the dialogue context associated with the user, i.e., Lan-PG and STC-PG in 730-6 located in Layer 4. Based on the updated agent's dialogue context and the user's dialogue context, the shared mind representation of the dialogue is then updated accordingly at 1335. Based on the updated shared mind, the context understanding unit 720-1 at Layer 3 then analyzes, at 1340, information from different sources to understand the current dialogue states to derive an updated joint-PG, where such information includes the updated dialogue contexts of both agent and the user as well as the analyzed dialogue surroundings such as user's emotion/intent, etc.

Based on the updated share mind and the newly updated joint-PG, the utility learning engine 740-1 in Layer 5 conducts machine learning, at 1345, to derive updated utilities or preferences. Based on the learned discrete utilities based on past dialogue histories, the discrete utilities are used to derive or update, at 1350, continuous expected utility functions. Based on the updated expected utility functions, the joint-PG, as well as the dialogue models, the dialogue manager 720-2 determines, at 1355, a response a* selected from all actions reachable from the current state of the dialogue because a* maximizes the expected utility function EU given the current dialogue state (captured by the joint-PG, and the user's state information from Layer 2). Based on the determined response a*, instructions for rendering the agent's response are generated at 1360 and sent to the agent device for rendering. The process then returns to 1305 for the next cycle.

Figure 14:
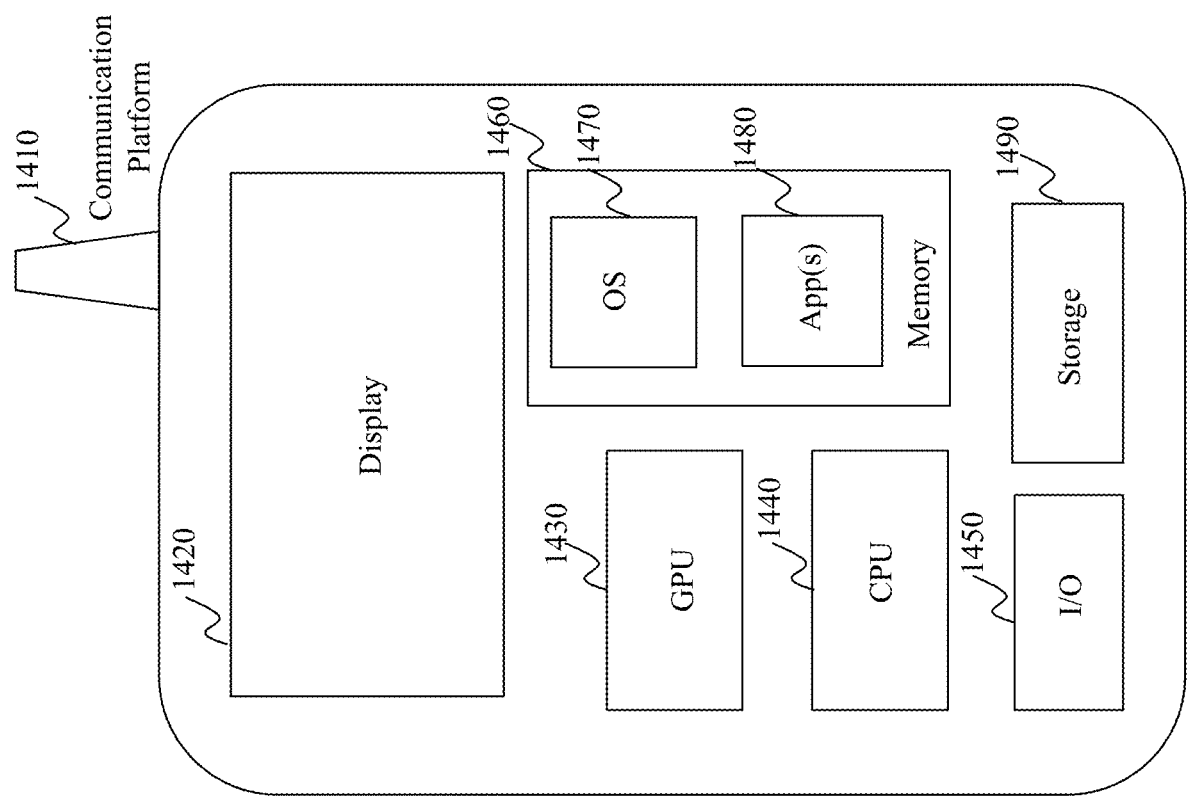
FIG. 14 is an illustrative diagram of an exemplary mobile device architecture that may be used to realize a specialized system implementing the present teaching in accordance with various embodiments.

FIG. 14 is an illustrative diagram of an exemplary mobile device architecture that may be used to realize a specialized system implementing the present teaching in accordance with various embodiments. In this example, the user device on which the present teaching is implemented corresponds to a mobile device 1400, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1400 may include one or more central processing units ("CPUs") 1440, one or more graphic processing units ("GPUs") 1430, a display 1420, a memory 1460, a communication platform 1410, such as a wireless communication module, storage 1490, and one or more input/output (I/O) devices 1440. Any other suitable component, including but not limited to a system bus or a controller (not shown), may also be included in the mobile device 1400. As shown in FIG. 14 a mobile operating system 1470 (e.g., iOS, Android, Windows Phone, etc.), and one or more applications 1480 may be loaded into memory 1460 from storage 1490 in order to be executed by the CPU 1440. The applications 1480 may include a browser or any other suitable mobile apps for managing a conversation system on mobile device 1400. User interactions may be achieved via the I/O devices 1440 and provided to the automated dialogue companion via network(s) 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 15:
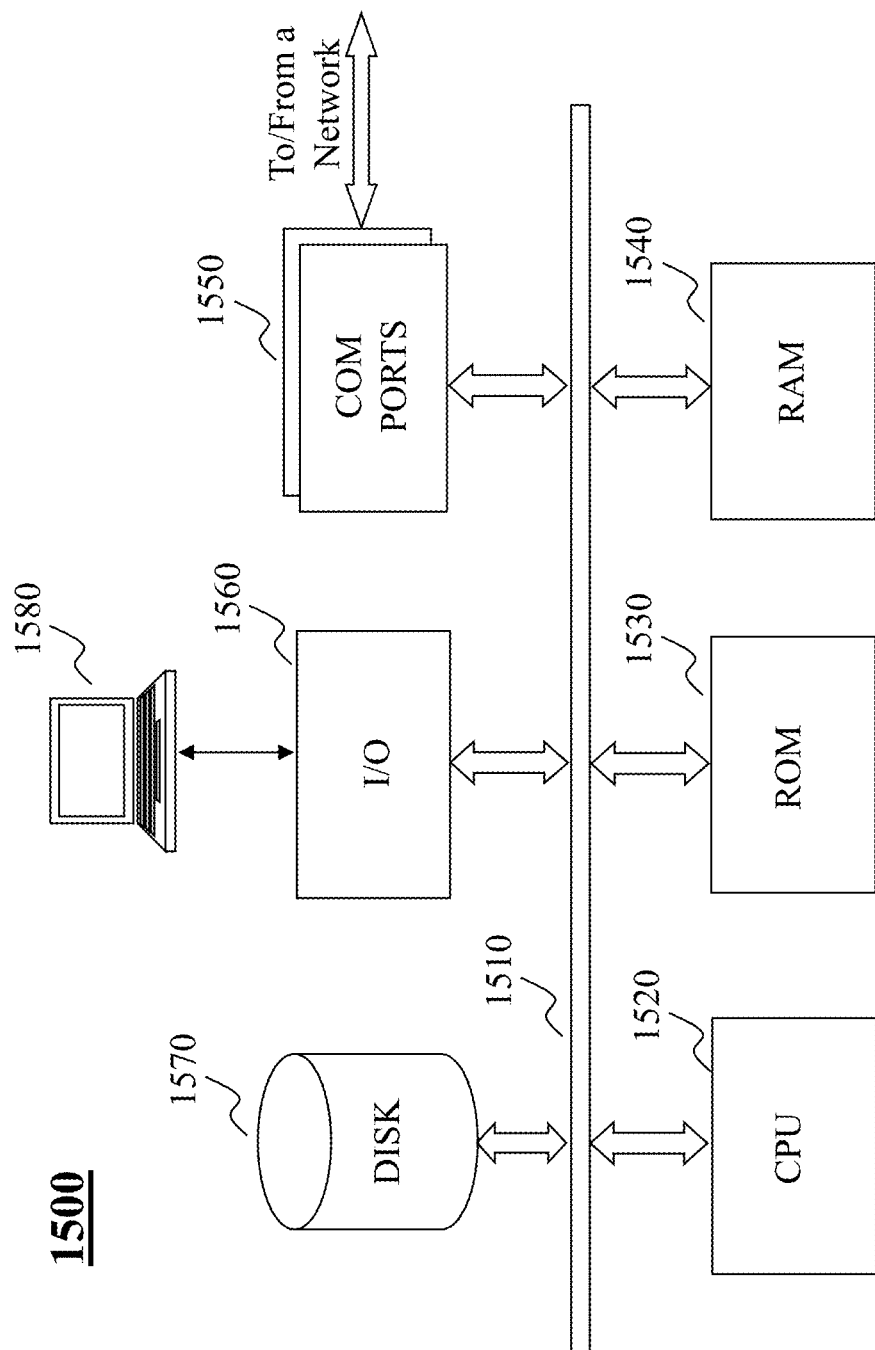
FIG. 15 is an illustrative diagram of an exemplary computing device architecture that may be used to realize a specialized system implementing the present teaching in accordance with various embodiments.

FIG. 15 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1500 may be used to implement any component of conversation or dialogue management system, as described herein. For example, conversation management system may be implemented on a computer such as computer 1500, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 1500, for example, includes COM ports 1550 connected to and from a network connected thereto to facilitate data communications. Computer 1500 also includes a central processing unit (CPU) 1520, in the form of one or more processors, for executing program instructions. The exemplary computer platform includes an internal communication bus 1510, program storage and data storage of different forms (e.g., disk 1570, read only memory (ROM) 1530, or random access memory (RAM) 1540), for various data files to be processed and/or communicated by computer 1500, as well as possibly program instructions to be executed by CPU 1520. Computer 1300 also includes an I/O component 1560, supporting input/output flows between the computer and other components therein such as user interface elements 1580. Computer 1500 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for user machine dialogue, the method comprising:
   receiving an instruction by an agent device for rendering a communication directed to a user involved in a dialogue in a dialogue scene;
   rendering the communication based on the instruction;
   updating a first representation of a mindset of the agent after the rendering based on the communication;
   receiving input data in one or more media types capturing a response from the user and information surrounding the dialogue scene;
   updating a second representation of a mindset of the user based on the response from the user and the information surrounding of the dialogue scene; and
   determining a next communication directed to the user in response to the response from the user based on the first representation of the mindset of the agent and the second representation of the mindset of the user, wherein the first and second representations comprise spatial, temporal, and causal And-OR Graphs that characterize, respectively, corresponding spatial, temporal, and causal relationships of the agent and the user.

2. The method of claim 1, wherein the communication directed to the user is one of an initial communication and a response to a previous response from the user and includes at least one of
   a verbal communication which can be uttered to the user;
   a facial expression for expressing a certain emotion;
   a physical act for expression a certain emotion.

3. The method of claim 1, wherein the first and second representations include at least one of
   a language parsed graph (Lan-PG), obtained based on the dialogue between the user and the agent; and
   a spatial-temporal-causal graph (STC-PG), obtained based on
   a spatial parsed graph (S-PG), obtained based on a spatial representation of objects involved in the dialogue,
   a temporal parsed graph (T-PG), obtained based on a temporal representation of acts that can be performed on the objects during the dialogue, and
   a causal parsed graph (C-PG), obtained based on a causal representation of transitions of the objects with respect to the acts performed thereon.

4. The method of claim 1, wherein
   the one or more media types include at least one of audio, visual, text, haptic media types;
   the information surrounding the dialogue scene includes at least one of audio information related to the response from the user and/or acoustic sound in the dialogue scene, and visual information capturing characteristics of the user and/or articles present in the dialogue scene.

5. The method of claim 1, further comprising:
   obtaining a third representation of a shared mindset of the user and the agent based on the first and the second representations; and
   generating a fourth representation of a current state of the dialogue based on the first representation, the second representation, and the information surrounding the dialogue scene.

6. The method of claim 5, further comprising performing learning of expected utilities that characterize effectiveness of dialogues based on historic dialogue data and the third representation of the shared mindset.

7. The method of claim 6, wherein the step of determining the next communication comprises:
   accessing a dialogue tree associated with the dialogue;
   determining a plurality of actions associated with a node in the dialogue tree corresponding to the current state of the dialogue; and
   selecting an action from the plurality of actions based on the joint representation and the expected utilities, wherein the action selected corresponds to the next communication that maximizes the learned expected utilities.

8. Machine readable and non-transitory medium having information recorded thereon for user machine dialogue, wherein the information, when read by the machine, causes the machine to perform the following:
   receiving an instruction by an agent device for rendering a communication directed to a user involved in a dialogue in a dialogue scene;
   rendering the communication based on the instruction;
   updating a first representation of a mindset of the agent after the rendering based on the communication;
   receiving input data in one or more media types capturing a response from the user and information surrounding the dialogue scene;
   updating a second representation of a mindset of the user based on the response from the user and the information surrounding of the dialogue scene; and
   determining a next communication directed to the user in response to the response from the user based on the first representation of the mindset of the agent and the second representation of the mindset of the user, wherein the first and second representations comprise spatial, temporal, and causal And-OR Graphs that characterize, respectively, corresponding spatial, temporal, and causal relationships of the agent and the user.

9. The medium of claim 8, wherein the communication directed to the user is one of an initial communication and a response to a previous response from the user and includes at least one of
   a verbal communication which can be uttered to the user;
   a facial expression for expressing a certain emotion;
   a physical act for expression a certain emotion.

10. The medium of claim 8, wherein the first and second representations include at least one of
  a language parsed graph (Lan-PG), obtained based on the dialogue between the user and the agent; and
  a spatial-temporal-causal graph (STC-PG), obtained based on
  a spatial parsed graph (S-PG), obtained based on a spatial representation of objects involved in the dialogue,
  a temporal parsed graph (T-PG), obtained based on a temporal representation of acts that can be performed on the objects during the dialogue, and
  a causal parsed graph (C-PG), obtained based on a causal representation of transitions of the objects with respect to the acts performed thereon.

11. The medium of claim 8, wherein
  the one or more media types include at least one of audio, visual, text, haptic media types;
  the information surrounding the dialogue scene includes at least one of audio information related to the response from the user and/or acoustic sound in the dialogue scene and visual information capturing characteristics of the user and/or articles present in the dialogue scene.

12. The medium of claim 8, wherein the information, when read by the machine, further causes the machine to perform:
  obtaining a third representation of a shared mindset of the user and the agent based on the first and the second representations; and
  generating a fourth representation of a current state of the dialogue based on the first representation, the second representation, and the information surrounding the dialogue scene.

13. The medium of claim 12, wherein the information, when read by the machine, further causes the machine performing learning of expected utilities that characterize effectiveness of dialogues based on historic dialogue data and the third representation of the shared mindset.

14. The medium of claim 13, wherein the step of determining the next communication comprises:
  accessing a dialogue tree associated with the dialogue;
  determining a plurality of actions associated with a node in the dialogue tree corresponding to the current state of the dialogue; and
  selecting an action from the plurality of actions based on the joint representation and the expected utilities, wherein the action selected corresponds to the next communication that maximizes the learned expected utilities.

15. A system for user machine dialogue, comprising:
  an agent device implemented on a processor and configured for
    receiving an instruction by an agent device for rendering a communication directed to a user involved in a dialogue in a dialogue scene,
    rendering the communication based on the instruction, and
    receiving input data in one or more media types capturing a response from the user and information surrounding the dialogue scene;
  a user interaction engine implemented on a processor and configured for updating
    a first representation of a mindset of the agent after the rendering based on the communication, and
    a second representation of a mindset of the user based on the response from the user and the information surrounding of the dialogue scene; and
  a dialogue manager implemented on a processor and configured for determining a next communication directed to the user in response to the response from the user based on the first representation of the mindset of the agent and the second representation of the mindset of the user, wherein the first and second representations comprise spatial, temporal, and causal And-OR Graphs that characterize, respectively, corresponding spatial, temporal, and causal relationships of the agent and the user.

16. The system of claim 15, wherein the communication directed to the user is one of an initial communication and a response to a previous response from the user and includes at least one of
  a verbal communication which can be uttered to the user;
  a facial expression for expressing a certain emotion;
  a physical act for expression a certain emotion.

17. The system of claim 15, wherein the first and second representations include at least one of
  a language parsed graph (Lan-PG), obtained based on the dialogue between the user and the agent; and
  a spatial-temporal-causal graph (STC-PG), obtained based on
  a spatial parsed graph (S-PG), obtained based on a spatial representation of objects involved in the dialogue,
  a temporal parsed graph (T-PG), obtained based on a temporal representation of acts that can be performed on the objects during the dialogue, and
  a causal parsed graph (C-PG), obtained based on a causal representation of transitions of the objects with respect to the acts performed thereon.

18. The system of claim 15, wherein
  the one or more media types include at least one of audio, visual, text, haptic media types;
  the information surrounding the dialogue scene includes at least one of audio information related to the response from the user and/or acoustic sound in the dialogue scene and visual information capturing characteristics of the user and/or articles present in the dialogue scene.

19. The system of claim 15, wherein the user interaction engine is further configured for:
  obtaining a third representation of a shared mindset of the user and the agent based on the first and the second representations; and
  generating a fourth representation of a current state of the dialogue based on the first representation, the second representation, and the information surrounding the dialogue scene.

20. The system of claim 19, wherein the user interaction engine further comprises a utility learning engine configured for performing learning of expected utilities that characterize effectiveness of dialogues based on historic dialogue data and the third representation of the shared mindset.

21. The system of claim 20, wherein the dialogue manager is further configured for:
  accessing a dialogue tree associated with the dialogue;
  determining a plurality of actions associated with a node in the dialogue tree corresponding to the current state of the dialogue; and
  selecting an action from the plurality of actions based on the joint representation and the expected utilities, wherein the action selected corresponds to the next communication that maximizes the learned expected utilities.

* * * * *